United States Patent
Koike-Akino et al.

(10) Patent No.: US 12,057,983 B2
(45) Date of Patent: Aug. 6, 2024

(54) SYSTEMS AND METHODS FOR DUAL CODING CONCATENATION IN PROBABILISTIC AMPLITUDE SHAPING

(71) Applicant: Mitsubishi Electric Research Laboratories, Inc., Cambridge, MA (US)

(72) Inventors: Toshiaki Koike-Akino, Belmont, MA (US); Kieran Parsons, Rockport, MA (US); Pavel Skvortcov, Aston (GB)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 467 days.

(21) Appl. No.: 17/386,375

(22) Filed: Jul. 27, 2021

(65) Prior Publication Data

US 2023/0033774 A1    Feb. 2, 2023

(51) Int. Cl.
H04L 27/26    (2006.01)
H04L 27/36    (2006.01)

(52) U.S. Cl.
CPC ...... *H04L 27/2617* (2013.01); *H04L 27/2621* (2013.01); *H04L 27/36* (2013.01)

(58) Field of Classification Search
CPC ... H04L 1/0042; H04L 27/36; H04L 27/2617; H04L 27/3411; H04L 27/2621; H04L 1/0065
See application file for complete search history.

(56) References Cited

U.S. PATENT DOCUMENTS 3,725,859 A    4/1973    Blair et al.
5,150,381 A    9/1992    Forney, Jr. et al.
(Continued)

FOREIGN PATENT DOCUMENTS

WO    1992017971    10/1992
WO    2010131125    11/2010
WO    2020031257    2/2020

OTHER PUBLICATIONS

Wu, M. R. Chitgarha, V. Lal, H. Tsai, S. Corzine, J. Zhang, J. Osenbach, S. Buggaveeti, Z. Morbi, M. I. Olmedo, I. Leung, X. Xu, P. Samra, V. Dominic, S. Sanders, M. Ziari, A. Napoli, B. Spinnler, K. Wu, and P. Kandappan, "800G DSP ASIC design using probabilistic shaping and digital sub-carrier multiplexing," IEEE/OSA Journal of Lightwave Technology, vol. 38, No. 17, pp. 4744-4756, 2020.

(Continued)

*Primary Examiner* — Oussama Roudani
(74) *Attorney, Agent, or Firm* — Gene Vinokur; Hironori Tsukamoto

(57) ABSTRACT

Data communications and storage systems require error control techniques and digital modulation schemes to be transferred efficiently and successfully. Constellation shaping based on probabilistic amplitude shaping (PAS) offers an energy-efficient transmission in particular for long shaping blocks. However, longer shaping blocks can cause burst errors and enhancement of bit error rates besides longer latency to complete distribution matcher and dematcher operations. Methods and systems are disclosed that provide a way to resolve the issues by introducing a dual concatenation of pre-shaping and post-shaping error correction codes to mitigate burst errors of shaping. This enables low-complexity, high-performance and parallel architecture with a balanced overhead of dual-concatenation codes for shaping systems.

20 Claims, 12 Drawing Sheets

(56) References Cited

U.S. PATENT DOCUMENTS

| | | | |
|---|---|---|---|
| 6,374,382 | B1 | 4/2002 | Solomon et al. |
| 6,532,565 | B1 | 3/2003 | Roth et al. |
| 7,065,167 | B2 | 6/2006 | Mcclellan |
| 7,460,595 | B2 | 12/2008 | Ungerboeck et al. |
| 8,873,672 | B2 | 10/2014 | Kolze |
| 8,984,364 | B2 * | 3/2015 | Zeng .................. H03M 13/29 714/752 |
| 9,673,907 | B1 | 6/2017 | Vassilieva et al. |
| 10,069,519 | B1 | 9/2018 | Millar et al. |
| 10,091,046 | B1 | 10/2018 | Lefevre |
| 10,181,973 | B2 | 1/2019 | Liu et al. |
| 10,200,231 | B1 * | 2/2019 | Lefevre .............. H04L 27/3411 |
| 10,355,821 | B2 | 7/2019 | Kakande |
| 10,516,503 | B1 | 12/2019 | Millar et al. |
| 10,523,400 | B2 | 12/2019 | Lefevre et al. |
| 10,541,711 | B1 | 1/2020 | Millar et al. |
| 10,742,472 | B1 | 8/2020 | Van Nee |
| 10,749,554 | B1 | 8/2020 | Millar et al. |
| 2002/0061070 | A1 | 5/2002 | Cameron et al. |
| 2003/0039318 | A1 * | 2/2003 | Tong .................. H04L 27/3411 375/298 |
| 2009/0019334 | A1 | 1/2009 | Tomlinson |
| 2014/0003560 | A1 * | 1/2014 | Kolze ................. H04L 1/0066 375/346 |
| 2018/0083716 | A1 | 3/2018 | Cho et al. |

OTHER PUBLICATIONS

G. Bocherer, F. Steiner, and P. Schulte, "Bandwidth efficient and rate-matched low-density parity-check coded modulation," IEEE Trans. Commun., vol. 63, No. 12, pp. 4651-4665, 2015.

P. Schulte and G. Bocherer, "Constant composition distribution match-ing," IEEE Trans. Inf. Theory, vol. 62, No. 1, pp. 430-434, 2016.

T. Fehenberger, D. S. Millar, T. Koike-Akino, K. Kojima, and K. Par-sons, "Multiset-partition distribution matching," IEEE Trans. Commun., vol. 67, No. 3, pp. 1885-1893, 2019.

D. S. Millar, T. Fehenberger, T. Koike-Akino, K. Kojima, and K. Par-sons, "Distribution matching for high spectral efficiency optical com-munication with multiset partitions," J. Lightw. Technol., vol. 37, No. 2, pp. 517-523, 2019.

F. Steiner, P. Schulte, and G. Bocherer, "Approaching waterfilling ca-pacity of parallel channels by higher order modulation and probabilistic amplitude shaping," in Ann. Conf. on Inf. Scien. and Sys. (CISS), 2018, pp. 1-6.

T. Yoshida, M. Karlsson, and E. Agrell, "Hierarchical distribution matching for probabilistically shaped coded modulation," J. Lightw. Technol., vol. 37, No. 6, pp. 1579-1589, 2019.

R. Laroia, N. Farvardin, and S. A. Tretter, "On optimal shaping of multidimensional constellations," IEEE Trans. Inf. Theory, vol. 40, No. 4, pp. 1044-1056, 1994.

A. K. Khandani and P. Kabal, "Shaping multidimensional signal spaces. I. optimum shaping, shell mapping," IEEE Trans. Inf. Theory, vol. 39, No. 6, pp. 1799-1808, 1993.

P. Schulte and F. Steiner, "Divergence-optimal fixed-to-fixed length distribution matching with shell mapping," IEEE Wireless Commun. Lett., vol. 8, No. 2, pp. 620-623, 2019.

Y. C. Gultekin, W. J. van Houtum, S. Ṣerbetli, and F. M. J. Willems, "Constellation shaping for IEEE 802.11," in Proc. IEEE PIMRC, Mon-treal, QC, Canada, 2017.

Y. C. Gultekin, W. J. van Houtum, A. G. C. Koppelaar, and F. M. J. Willems, "Enumerative sphere shaping for wireless communications with short packets," IEEE Trans. Wireless Commun., vol. 19, No. 2, pp. 1098-1112, 2020.

A.Amari, S.Goossens,Y.C.Gultekin,O.Vassilieva,I.Kim,T.Ikeuchi, C. M. Okonkwo, F. M. J. Willems, and A. Alvarado, "Introducing enumerative sphere shaping for optical communication systems with short blocklengths," J. Lightw. Technol., vol. 37, No. 23, pp. 5926-5936, 2019.

D. S. Millar, T. Fehenberger, T. Yoshida, T. Koike-Akino, K. Kojima, N. Suzuki, and K. Parsons, "Huffman coded sphere shaping with short length and reduced complexity," in Proc. Europ. Conf. Opt. Commun. (ECOC), Dublin, Ireland, 2019.

T. Fehenberger, D. S. Millar, T. Koike-Akino, K. Kojima, K. Parsons, and H. Griesser, "Huffman-coded sphere shaping and distribution match-ing algorithms via lookup tables," J. Lightw. Technol., vol. 38, No. 10, pp. 2826-2834, 2020.

S. Goossens, S. Van der Heide, M. Van den Hout, A. Amari, Y. C. Gultekin, O. Vassilieva, I. Kim, T. Ikeuchi, F. M. J. Willems, A. Al-varado, and C. Okonkwo, "First experimental demonstration of proba-bilistic enumerative sphere shaping in optical fiber communications," in Proc. Opto-Electron. Commun. Conf. (OECC) and Int. Conf. on Phot. in Switch. and Comp. (PSC), Fukuoka, Japan, 2019.

P. Skvortcov, I. Phillips, W. Forysiak, T. Koike-Akino, K. Kojima, K. Parsons, and D. S. Millar, "Nonlinearity tolerant LUT-based prob-abilistic shaping for extended-reach single-span links," IEEE Photon. Technol. Lett., vol. 32, No. 16, pp. 967-970, 2020.

P. Skvortcov, I. Phillips, W. Forysiak, T. Koike-Akino, K. Kojima, K. Parsons, and D. S. Millar, "Huffman-coded sphere shaping for extended-reach single-span links," IEEE Journal of Selected Topics in Quantum Electronics, vol. 27, No. 3, pp. 1-15, 2021.

T. Yoshida, M. Karlsson, and E. Agrell, "Technologies toward imple-mentation of probabilistic constellation shaping," in 2018 European Conference on Optical Communication (ECOC), 2018, pp. 1-3.

* cited by examiner

| Configuration | $OH_{BCH}^{PostSh}$ | $OH_{BCH}^{PreSh}$ | $OH_{BCH}^{PreSh'}$ | $R_{Tr}$, b/1D |
|---|---|---|---|---|
| A1 (pre-sh.) | 0.00 | 3.02 | 1.49 | 1.1284 |
| A2 | 0.29 | 2.40 | 1.19 | 1.1284 |
| A3 (optimal) | 0.59 | 1.79 | 0.89 | 1.1285 |
| A4 | 0.89 | 0.89 | 0.89 | 1.1310 |
| A5 | 1.19 | 0.29 | 0.29 | 1.1314 |
| A6 (post-sh.) | 1.49 | 0.00 | 0.00 | 1.1284 |

| Configuration | $OH_{BCH}^{PostSh}$ | $OH_{BCH}^{PreSh}$ | $OH_{BCH}^{PreSh'}$ | $R_{Tr}$, b/1D |
|---|---|---|---|---|
| B1 (pre-sh.) | 0.00 | 2.77 | 2.44 | 1.1292 |
| B2 | 0.16 | 2.44 | 2.27 | 1.1293 |
| B3 | 0.32 | 2.27 | 1.12 | 1.1292 |
| B4 | 0.48 | 1.94 | 0.96 | 1.1292 |
| B5 | 0.64 | 1.61 | 0.80 | 1.1293 |
| B6 | 0.80 | 1.29 | 0.64 | 1.1293 |
| B7 (optimal) | 0.96 | 0.96 | 0.48 | 1.1292 |
| B8 | 1.12 | 0.48 | 0.48 | 1.1306 |
| B9 | 1.29 | 0.16 | 0.16 | 1.1308 |
| B10 (post-sh.) | 1.45 | 0.00 | 0.00 | 1.1291 |

*FIG. 6A*

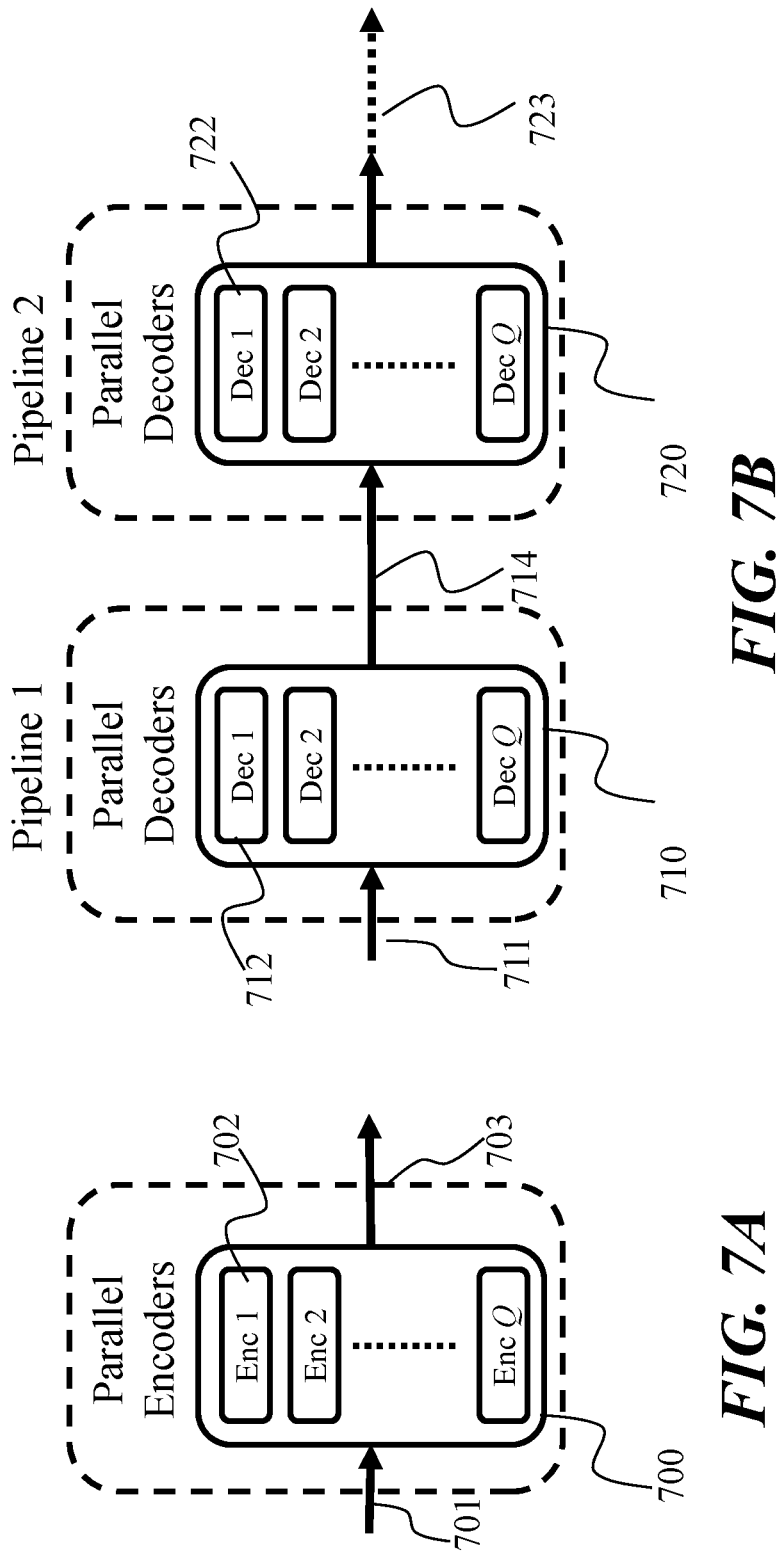

SYSTEMS AND METHODS FOR DUAL CODING CONCATENATION IN PROBABILISTIC AMPLITUDE SHAPING

FIELD OF THE INVENTION

The present invention relates generally to the field of error-correcting codes for data transmission, and more particularly to methods and systems for burst error-correcting concatenated codes integrated with probabilistic amplitude shaping.

BACKGROUND OF THE INVENTION

In digital communications, uniform modulation formats such as quadrature-amplitude modulation (QAM) have often been used as adjacent constellation points which can be well distinguished. However, the optimal signal distribution for an additive white Gaussian noise (AWGN) channel is not uniform. There are two primary approaches to generate the non-uniform distribution for digital communications systems: i.) geometric shaping, whereby equiprobable constellation points are arranged in a non-uniform manner; and ii.) probabilistic shaping, whereby the probabilities of constellation points are distributed in a non-uniform manner. While the performance of probabilistic shaping is generally superior to the performance of geometric shaping for equal cardinality, methods for mapping sequences of uniformly distributed bits of information onto sequences of non-equiprobable symbols are challenging. The most commonly used method is based on constant-composition distribution matching (CCDM), which maps equiprobable bits onto a sequence which is a permutation of the "typical sequence," which has the desired symbol probability mass function (PMF). While this method can achieve good performance (achieving arbitrarily low rate loss for asymptotically long symbol sequences), it has two critical flaws: the ability to achieve low rate-loss requires very long sequences, which causes high complexity and latency; and the only known efficient mapping and de-mapping algorithms are sequential in symbols (i.e., need to decode each symbol in-turn in a symbol sequence), which also leads to high complexity and latency.

In recent years probabilistic constellation shaping has evolved as a mature technology. The key enabler for probabilistic shaping in practical systems has been the introduction of probabilistic amplitude shaping (PAS). PAS allows for relatively low-complexity implementation of probabilistic shaping into bit-interleaved coded modulation (BICM) systems and independent design of coding and shaping stages. Specifically, PAS enables reverse concatenation of probabilistic shaping and error-correcting coding, whereas the conventional forward concatenation had a difficult to decouple the design of shaping and channel coding.

Many practical finite-length shaping mapping and demapping approaches have been proposed since the initial proposal of PAS. One class is based on targeting fixed distribution of amplitudes and referred to as distribution matching (DM), e.g., CCDM, multiset-partition DM (MPDM), product DM and hierarchical DM. Another class is based on defining the most energy-efficient signal space for finite-length shaping regime based on spherical shaping (SS). Examples of algorithms realizing spherical shaping include shell mapping (SM), enumerative sphere shaping (ESS), and Huffman-coded sphere shaping (HCSS). Typically, DM approaches require longer shaping length compared to energy-efficient SS-based approaches to achieve the same performance in linear channels. Also, while the best performance for linear channels is achieved with asymptomatic infinite-length shaping, for nonlinear fiber-optical channels finite-length shaping was shown to outperform infinite-length shaping due to complimentary nonlinear performance gains. For energy-efficient SS-based approaches the optimal shaping length is in the range of 100-to-200 amplitudes for long-haul fiber links and 20-to-50 amplitudes for highly nonlinear short-distance unrepeated links. The short-length shaping is also advantageous in terms of hardware complexity and system latency.

The conventional PAS architecture typically employs reverse concatenation of shaping and forward error correction (FEC) stages, where FEC coding is performed on shaped bits. The common approach for FEC in PAS is concatenation of a powerful soft-decision (SD) code with a low-complexity hard-decision (HD) code with low overhead for error floor mitigation to achieve a target bit-error rate (BER). For example, the SD codes include capacity-achieving low-density parity-check (LDPC) codes and turbo codes, whereas the HD codes include Bose-Chaudhuri-Hocquenghem (BCH) codes and Reed-Muller codes.

At a receiver side, shaped bits are first decoded and then demapped (i.e., de-shaped) to information bits under the idealistic assumption that all bits are correctly decoded (no errors within shaping sequences). While state-of-the-art FEC can in general achieve arbitrarily low output BERs when increasing the code word lengths at a code rate below the Shannon limit, they always have a non-zero probability of errors in practice. The most commonly considered post-FEC BER threshold is $10^{-15}$, which corresponds to the bound on acceptable performance after FEC decoding for conventional systems with uniform signalling without shaping. However, for systems utilizing PAS architecture, BER enhancement may occur after shaping demapping due to uncorrected errors within shaped sequences after FEC decoding—a single bit error within a shaped sequence at the input to the shaping demapper in most cases will correspond to multiple errors of up to a shaping block length (i.e., burst error) at the output of the shaping demapper. While some work has been done on shaping mappers/demappers which reduce the effect of BER enhancement, it is not universally applicable to all mapping/demapping schemes.

For conventional PAS with reverse concatenation the solution is to increase the error correcting ability of FEC codes and target lower post-FEC BER such after shaping demapping enhanced BER is below $10^{-15}$. Hence, more powerful SD FEC codes with higher complexity will be required to compensate for the BER enhancement in PAS systems. Therefore, there is a need and demand to efficiently resolve the burst error and BER enhancement issues for communications systems with PAS, without relying on high-power high-performance SD FEC codes.

SUMMARY OF THE INVENTION

Some embodiments use a dual concatenation with a pre-shaping (forwardly concatenated) and a post-shaping (reversely concatenated) FEC layers for PAS to mitigate BER enhancement caused by shaping demapping failures. Some example embodiments are based on the realization that the joint use of pre-shaping and post-shaping BCH codes can significantly relax a bit error rate (BER) threshold after soft-decision FEC code, resulting in a substantial signal-to-noise ratio (SNR) gain. For the pre-shaping FEC layer, various burst error correction approaches are used in some embodiments. For example, some embodiments enable a low-complexity scalable architecture for correction of burst errors in the pre-shaping FEC layer, which is based on block interleaving of shaping sequences and parallel encoding and decoding with short low-overhead BCH codes. The fully parallelizable dual concatenation approach of pre-shaped and post-shaped codes mitigate different error patterns, e.g., burst errors after shaping and random channel errors before shaping. The pre-shaping and post-shaping FEC are complementally designed with a flexible overhead balancing to relax the requirement of soft-decision FEC performance, resulting into further complexity/power/latency reduction for high-throughput data transmissions.

Some embodiments are based on the recognition that data communications and data storage require error control techniques to be sent successfully and efficiently without failure. A concatenation of a constellation shaping technique and a forward error correction (FEC) technique may be demonstrated to realize an energy-efficient data transmission approaching the channel capacity by adjusting the shaping rate and coding rates to match the distribution of coded modulation symbols with a target probability mass function (PMF). However, the conventional forward concatenation which uses a pre-shaping FEC code before a shaping mapper suffers a high probability of deshaping failures due to the channel noise and distortion. The conventional reverse concatenation which uses a post-shaping FEC code after a shaping mapper also causes an enhancement of error rates and a catastrophic burst error. The method and system of some example embodiments provide a way to resolve those issues by introducing the joint use of forward and reverse concatenation, where a pre-shaping FEC code and a post-shaping FEC code are jointly used with a shaping mapper so that highly flexible and parallelizable architecture is realized to achieve a high coding gain and high throughput without increasing the computational complexity and latency.

Some example embodiments enable non-obvious benefit in decreasing the total overhead and required SNR threshold of input BER, by controlling a balance of the code rates for the pre-shaping and the post-shaping FEC codes. Also, some embodiments use hard-decision FEC codes for the dual-concatenation codes on top of a soft-decision post-shaping FEC code to further reduce the complexity, the latency, and power consumption, by relaxing the soft-decision FEC code. Some embodiments enable highly parallel implementation with a block interleaving to outperform conventional reverse or forward concatenation. In such a manner, example embodiments enable a more efficient pre-shaping FEC coding depending on a shaping rate because the length of message bits can be reduced before a shaping mapper compared to a post-shaping message.

In several aspects, example embodiments of the present disclosure are different from any conventional PAS concatenated with FEC codes. For example, the conventional forward concatenation does not employ post-shaping FEC codes, whereas the conventional reverse concatenation does not use pre-shaping FEC codes. In addition, the dual concatenation of the present invention is different from any concatenated coding methods such as a serial concatenation code or a parallel concatenation code, since a shaping mapper is sandwiched by a pre-shaping FEC code and a post-shaping FEC code. More importantly, the method and system of some example embodiments are based on the recognition that the error patterns before and after constellation shaping are different. Specifically, the post-shaping FEC code and pre-shaping FEC code are designed to control random errors and burst errors, respectively. Accordingly, the method and system of the some example embodiments generalize the concept of the forward concatenation and the reverse concatenation of PAS systems in a non-obvious manner. In addition, some example embodiments provide an additional degree of freedom to adjust the priority for error robustness against random noise and burst errors by adaptively modifying the code overheads for the pre-shaping and post-shaping FEC codes according to the shaping mapper and channel knowledge. With low-overhead HD BCH codes with a block interleaver, some example embodiments realize a hardware-friendly parallel encoding and decoding without increasing any computational complexity but increasing degrees of freedom in code design.

Accordingly, some embodiments disclose a method and system for reliably transferring data over a communication channel from a transmitter to a receiver. In some embodiments, the method and system include at least one computing processor, at least one memory bank, a transmitter having a source to accept a source data to be transferred, an encoder to encode the source data, and a front-end interface to transmit the encoded codeword as a modulated signal into the communication channel. In some embodiments, the method and system further include a communication channel comprising a wired medium channel, a wireless medium channel, an optical fiber channel, a vacuum free-space channel, a data storage medium, or a variant thereof. In some embodiments, the method and system further include a receiver having a front-end interface to receive an output signal from the communication channel, a decoder to decode the output signal, and a sink to provide the decoded codeword. In yet other embodiments, the method and system have a controller to specify parameters of pre-shaping codes, post-shaping codes, shaping mappers, and shaping demappers used in the encoder and the decoder, depending on a knowledge of the channel, wherein the parameters further comprise codeword lengths, code rates, and overheads.

The proposed method for encoding increases a robustness against unknown noise and errors which may occur through a communication channel. In addition, it is possible to further increase a robustness against burst errors caused by failures of deshaping operation. The encoding method according to some example embodiments resolve both the random and burst errors by a flexible and parallelizable structure with joint use of pre-shaping and post-shaping FEC codes with PAS. The method and system for the encoding in the transmitter include steps of accessing a source bit stream as an input digital data, encoding the input digital data by appending pre-shaping parity bits according to a pre-shaping error-correction code, mapping the pre-shaping bits into a series of amplitude modulation symbols, whose distribution are modified according to a shaping mapper, labeling the shaped amplitude modulation symbols into a shaped bit stream, encoding the shaped bit stream by appending post-shaping parity bits according to a post-shaping error-correction code, and mapping the encoded bit data into a series of quadrature amplitude modulation symbols.

The method and system according to some example embodiments further implement a shaping mapper based on a Huffman-coded sphere shaping, a shell mapping, a multi-set partition distribution matching, a constant-composite distribution matching, a hierarchical distribution matching, an enumerative sphere shaping, a look-up table and a combination thereof, to determine the series of amplitude symbols given the pre-shaping bits for matching a probability mass function for a set of amplitude symbols to a target distribution.

The method and system according to some example embodiments further use a post-shaping error-correction code based on a soft-decision coding such as low-density parity-check codes, turbo convolutional codes, turbo block codes, polar codes, staircase codes, or a variant thereof. Alternatively or additionally, the method and system employ a post-shaping error-correction code based on a serial concatenation of hard-decision coding and soft-decision coding, wherein the hard-decision coding is based on Reed-Solomon codes, Bose-Chaudhuri-Hocquenghem (BCH) codes, Reed-Muller codes, quasi-cyclic codes, Hamming codes, or a variant thereof, and wherein the soft-decision coding is based on low-density parity-check codes, turbo convolutional codes, turbo block codes, polar codes, staircase codes, or a variant thereof.

In the method and system according to some embodiments, the pre-shaping error-correction code is a burst error-correcting code based on fire codes, Reed-Solomon codes, BCH codes, Hamming codes, or a variant thereof, wherein a plural of codewords are arranged in a specified order by a block interleaving. In addition, the pre-shaping error-correction code and the post-shaping error-correction code use a balanced overhead such that a total data rate is maximized depending on a shaping rate and shaping length specified by the shaping mapper.

In such a manner, the method and system according to some example embodiments use an inverse operation at a receiver to recover shaping bits and original data through FEC decoding and shaping demapper. Specifically, a computer-implemented method for recovering an encoded bit stream is performed by one or more computing processors at the receiver, causing steps of accessing an input data which represents a noisy codeword, demapping the input data to generate soft-decision bit stream given noisy quadrature amplitude modulation symbols, decoding the bit stream according to a post-shaping error-correction code, mapping the decoded bit labels into amplitude modulation symbols, demapping the amplitude symbols according to a shaping demapper, and decoding the de-shaped bit stream according to a pre-shaping error-correction code.

Yet another embodiment discloses a non-transitory computer readable storage medium embodied thereon a program executable by a processor for performing the above-mentioned methods for reliably transferring a digital data. Systems and methods according to embodiments of the present disclosure improve the performance of error corrections and decoding throughput, and also reduce the computational complexity, decoding latency, and the power consumption of a real-time hardware processor. Specifically, the system and method realize a set of pipelined/parallel encoders and a set of pipelined/parallel decoders with a block interleaver.

Yet another embodiment provides an encoder, comprising a memory configured to store executable instructions and one or more processors configured to execute the instructions to access a source bit stream as an input digital data, encode the input digital data by appending pre-shaping parity bits according to a pre-shaping error-correction code and map the pre-shaping bits into a series of amplitude modulation symbols, whose distribution are modified according to a shaping mapper. The one or more processors are further configured to label the shaped amplitude modulation symbols into a shaped bit stream and encode the shaped bit stream by appending post-shaping parity bits according to a post-shaping error-correction code.

Yet another embodiment provides a decoder, comprising a memory configured to store executable instructions; and one or more processors configured to execute the instructions to access an input data which represents a noisy codeword. The one or more processors are further configured to demap the input data to generate soft-decision bit stream given noisy quadrature amplitude modulation symbols, decode the bit stream according to a post-shaping error-correction code, map the decoded bit labels into amplitude modulation symbols; demap the amplitude symbols according to a shaping demapper and decode the de-shaped bit stream according to a pre-shaping error-correction code.

Some example embodiments provide a system comprising a transmitter, a communication channel, a receiver, and a controller. The transmitter includes a source to accept a source data to be transferred, the encoder for generating an encoded codeword, and a front-end interface to transmit the encoded codeword as a modulated signal into the communication channel. The communication channel comprises a wired medium channel, a wireless medium channel, an optical fiber channel, a vacuum free-space channel, a data storage medium, or a variant thereof. The receiver comprises a front-end interface to receive an output signal from the communication channel, the decoder for decoding the encoded codeword, and a sink to provide the decoded codeword. The controller is configured to specify parameters of pre-shaping codes, post-shaping codes, shaping mappers, and shaping demappers used in the encoder and the decoder, depending on a knowledge of the channel, wherein the parameters further comprise codeword lengths, code rates, and overheads.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments. In particular:

FIG. 6A illustrates exemplar configurations of seamless overhead selections for dual-concatenation coding structure according to some embodiments;

FIG. 7A and FIG. 7B illustrate exemplar implementation of parallel and pipelined encoder and decoder according to some embodiments;

Figure 1:
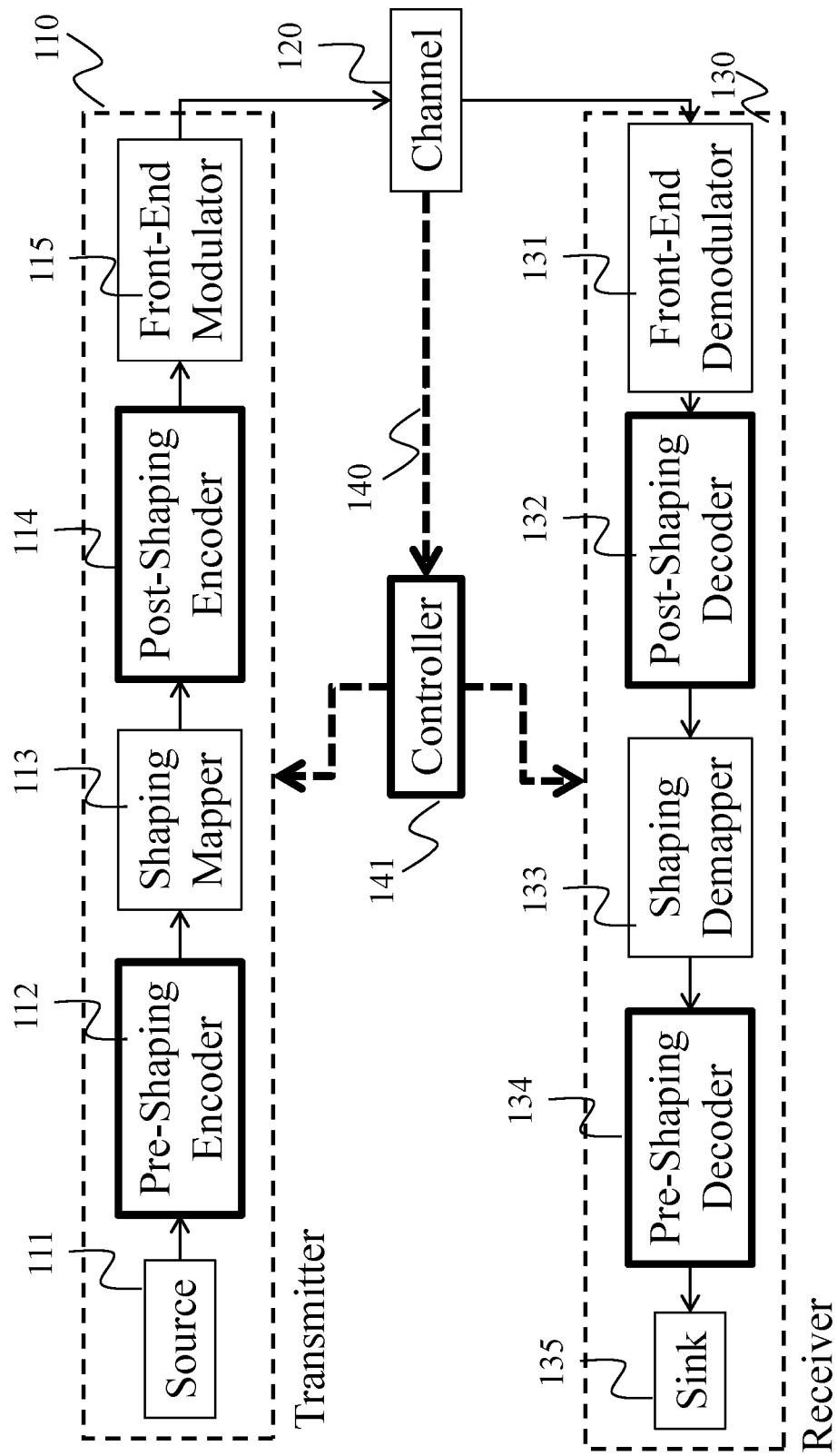
FIG. 1 is a function diagram of a communication system and method for transmission of digital data according to some embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the field of digital communications, forward error correction (FEC) through the application of an error control code (ECC) is a technique of encoding messages to add redundancy in order to mitigate uncertainty introduced by a noisy communication channel, allowing transmission errors to be corrected by a decoder. Generally, an FEC encoder is a system or employs a method for converting a sequence of data symbols (representing a source message or a source bit stream) into a more redundant sequence of code symbols (representing an encoded message or codeword) that are transmitted over a noisy channel. The codeword is further mapped to a series of modulation symbols for energy efficient transmission before being fed into the communication channel through a front-end circuit. An FEC decoder is a system or a method for recovering an estimate of the original source data symbols from a noisy output of the channel, which introduced unknown random perturbation to be corrected.

FIG. 1 illustrates a communications system for transmissions of a digital data from a transmitter 110 to a receiver 130 over a channel 120 according to some embodiments. The communication channel 120 may include, but not limited to, air medium for radio communications, copper cable for wired communications, solid-state drive for data storage reading/writing, vacuum for free-space satellite communications, and fiber cable for fiber-optic communications. During the communication to transfer the digital data from the transmitter 110 to the receiver 130, the digital data may be corrupted by a noise such as AWGN occurred across the channel and data processing path between a data source 111 and a data sink 135. For example, the noise includes but not limited to a thermal noise, a spontaneous emission amplifier noise, a reflection/refraction of non-uniform medium, an interference noise, and impulsive shot noise. The transmitter 110 uses a concatenation of a pre-shaping FEC encoder 112, a shaping mapper 113, and a post-shaping FEC encoder 114 to realize reliable data transmissions. The receiver 130 uses a concatenation of a post-shaping FEC decoder 132, a shaping demapper 133, and a pre-shaping FEC decoder 134, to recover the original data from noisy message which was sent by the transmitter 110.

At the transmitter 110, the data to be sent comes from the source 111 that is configured to accept the original data. The source may include but not limited to a memory bank to read out the data, an interface port to receive the data, or a device to generate the data. For example, in some embodiments, the source includes a voice communication device transforming an input voice signal into the digital data. The input data from the source 111 are encoded by the pre-shaping FEC encoder 112. In some cases, the encoded data may be referred to as a codeword. The pre-shaping FEC encoder appends a series of overhead parity bits to be robust against potential burst errors. The encoded data are mapped to a series of amplitude symbols according to the shaping mapper 113, which further appends redundancy to match the probability mass function (PMF) of the amplitude occurrence to a target distribution. The shaped amplitude symbols are labeled into a series of shaped bits, and further encoded by the post-shaping FEC encoder 114. The post-shaping FEC encoder appends additional overhead parity bits to be robust against the channel noise. The encoded symbols are fed into the channel medium via a front-end circuit 115, which uses various modulation formats, including but not limited to quadrature-amplitude modulation (QAM) with and without linear transforms such as orthogonal frequency-division multiplexing (OFDM). The front-end circuit 114 may further include but not limited to electro-optic circuits for optical communications and radio-frequency circuits for radio communications. For example, the front-end circuit includes digital-to-analog converter, power amplifier, and signal pre-processing such as band-pass filter, pulse shaping, precoding, power loading, pilot insertion, and pre-distortion.

The transmitted signal may get distorted in the channel 120. For example, the channel 120 may add AWGN, co-channel interference, deep fading, impulsive noise, inter-symbol interference, Kerr-induced nonlinear interference, polarization crosstalk, and linear chromatic dispersion as well as residual hardware imperfection such as quantization error, clock jitter, overflows, laser linewidth, and carrier phase noise.

The receiver 130 first converts the channel output into electrical received signals via a front-end circuit 131, which is typically complementary of the front-end 114 at the transmitter. For example, the front-end circuit includes but not limited to analog-to-digital converter, linear equalization, nonlinear equalization, adaptive filtering, channel estimation, carrier phase recovery, synchronization, and polarization recovery. Through the front-end circuit, the received signals are demodulated to produce an initial estimate of the bits of the transmitted codeword, which are used by the post-shaping FEC decoder 132 for mitigating the channel noise and distortions. For example, the demodulated signal represents a log-likelihood ratio (LLR) value as a soft-input message to the post-shaping FEC decoder 132.

The decoded messages are then demapped by the shaping demapper 133 to convert the shaped non-uniform symbols into a uniform data sequence by removing the overhead introduced by the shaping mapper 113. Even with the post-shaping FEC decoding, there is still non-zero probability that the shaping demapper fails due to a potentially remaining error bit. A single error bit can further cause a catastrophic burst error in the deshaped bits depending on the shaping length. In order to correct the burst errors, the deshaped bit sequence is further decoded by the pre-shaping FEC decoder 134, before being fed into the sink 135. The data sink 135 includes but not limited to a memory bank to write the data, an output interface port to send the data, and a device to receive the data. For example, in some embodiments, the sink includes a voice communication device transforming the decoded data into a sound signal.

Some embodiments are based on realization that the FEC codes and the shaping specification are adaptively controlled by a controller 141, according to a side information 140 of the communication channel 120. For example, parameters such as a code rate (or overhead), a codeword length, a shaping rate, and a shaping length are adaptively selected based on the channel knowledge such as a signal-to-noise ratio (SNR), a power delay profile, a channel transfer function, and a nonlinear statistics including but not limited to a mean, a variance, a kurtoris, and higher moments.

The transmitter 110 and/or the receiver 130 may be implemented using a hardware processor operatively connected to a memory. Each of the transmitter 110 and the receiver 130 may include one or more processors. For example, the memory of the receiver 130 may store some information related to one or combination of the shaping mapper and demapper, the soft-input and the soft-output of the decoder 133, results of intermediate calculations and parameters of the encoding and the decoding, and an adaptive coding policy. All the components in the transmitter 110 and the receiver 130 may be implemented by hardware, one or more hardware processors, computer software (program or program modules), or a combination of hardware and computer software.

Dual Concatenation Probabilistic Amplitude Shaping (PAS)

The communication system illustrated in FIG. 1 uses probabilistic amplitude shaping (PAS) architecture, in conjunction with pre-shaping and post-shaping FEC layers, which may be referred to as dual concatenation. The PAS framework may efficiently decouple the complicated design problems of the FEC codes and the shaping mapper. The dual concatenation architecture of the present invention is different from conventional PAS architectures which are based on either a forward concatenation or a reverse concatenation. The typical forward concatenation uses only a pre-shaping FEC code before constellation shaping, which is vulnerable to the channel noise. The typical reverse concatenation uses only a post-shaping FEC code to efficiently resolve the noise issue. However, this conventional PAS architecture based on the reverse concatenation has various drawbacks as follows:

- The shaping mapper increases the length of the bit stream depending on the shaping rate, and hence the post-shaping FEC code needs to encode more bits compared to the pre-shaping bits.
- A single bit error within a shaping block causes catastrophic burst errors after deshaping via the shaping demapper;
- The burst errors causes a bit-error rate (BER) enhancement, where the probability of errors is significantly increased with the shaping length; and
- To improve the post-FEC BER to compensate for the BER enhancement, the post-shaping FEC codes require to employ higher-power higher-complexity decoding and longer codeword lengths.

Example embodiments disclosed herein efficiently resolve the above issues caused by the reverse concatenation for the PAS architecture, by using the dual concatenation architecture which jointly employs the forward concatenation (i.e., FEC before shaping) and the reverse concatenation (i.e., FEC after shaping).

The key components of the PAS architecture are the shaping layer, i.e., the shaping mapper 113 and the shaping demapper 133, which respectively perform mapping and demapping of the stream of uniform input bits into unsigned probabilistically shaped amplitudes. The post-shaping FEC layer, i.e., the post-shaping FEC encoder 114 and the post-shaping FEC decoder 132, is placed to mitigate the channel noise for the shaping layer. Post-shaping systematic FEC coding is performed on the bit-labels of the shaped amplitudes and parity bits are added as signs of amplitudes. Signed amplitudes which represent amplitude-shift keying (ASK) are then concatenated into symbols of a quadrature-amplitude modulation (QAM) format. In that structure, the transmission rate may be adapted by changing the amplitude shaping rate, regardless of adaptability of the post-shaping FEC code rate. The pre-shaping FEC layer, i.e., the pre-shaping FEC encoder 112 and the pre-shaping FEC decoder 134, is placed outside the shaping layer and designed to correct burst errors after shaping demapper due to residual errors after post-shaping FEC decoding.

Figure 2:
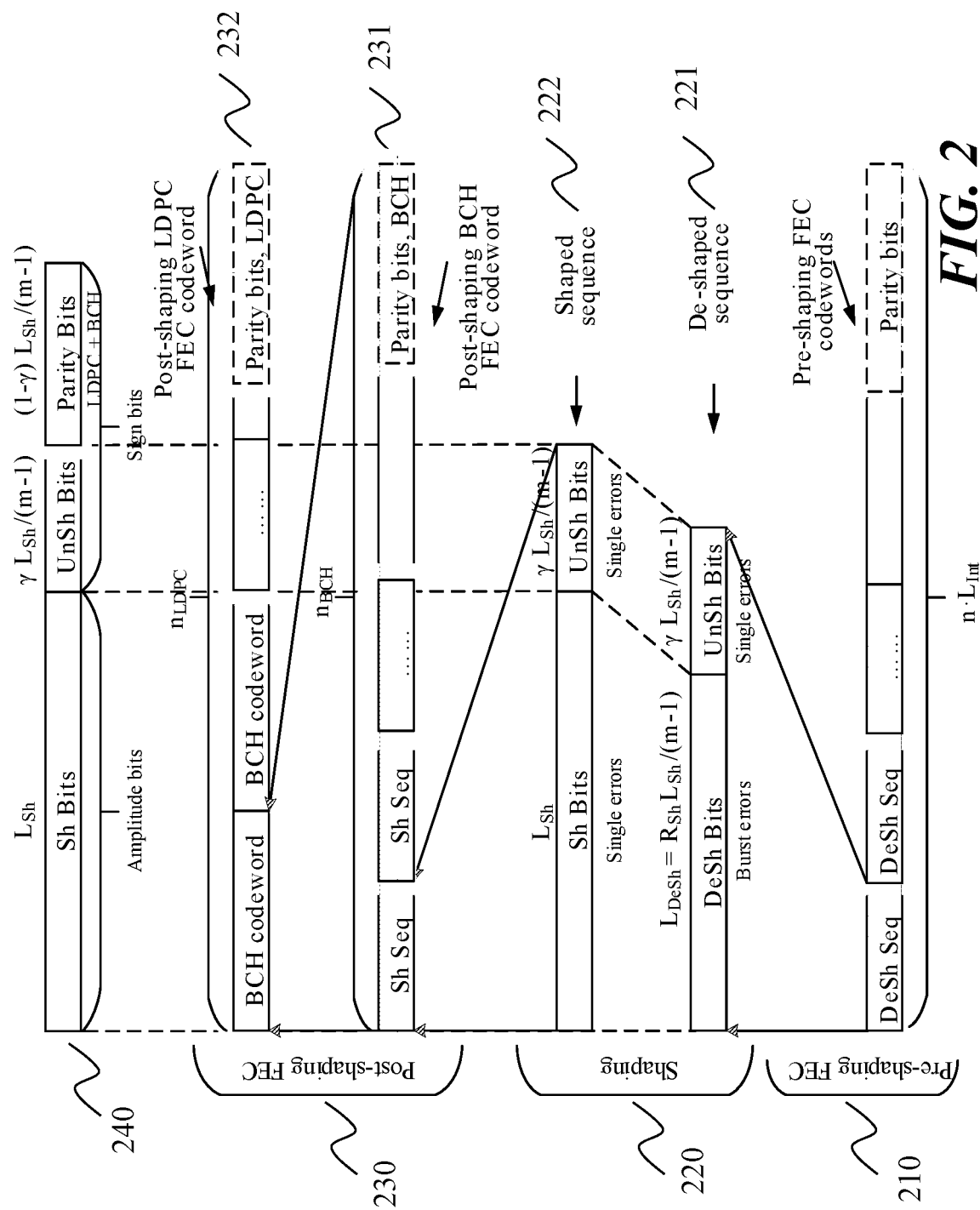
FIG. 2 illustrates a schematic of an exemplar framing structure of the system according to some embodiments.

FIG. 2 shows an exemplar framing structure of shaping sequences and FEC codewords for the dual concatenation PAS systems according to some embodiments of the invention. The pre-shaping FEC layer 210 first appends parity bits to form a codeword, where the FEC codewords may be interleaved with an interleaver depth size of $L_{int}$. The shaping layer 220 then modifies the part of encoded bits to adjust the PMF of unsigned amplitude, where the deshaped sequence 221 is partitioned into two parts, deshaped bits and unshaped bits. The length of the deshaped bits is increased by the shaping mapper while the unshaped bits are kept unmodified in the shaped sequence 222.

The overhead of the shaping mapper depends on a shaping rate, as defined in bits per unsigned amplitude (b/Amp) as follows:

$$R_{Sh} = \frac{L_{DeSh}}{L_{Sh}^{Amp}} = \frac{L_{DeSh}}{L_{Sh}}(m-1),$$

where $L_{Sh}^{Amp}$ is the length of the shaped sequence in amplitudes, $L_{Sh}$ is the corresponding length of the shaped bits, and $L_{DeSh}$ is the length of de-shaped bits, m is the number of bit labels per amplitude, i.e., $m=\log_2(M)$ for M-ary ASK format. In some embodiments, $L_{Sh}$ is fixed and $L_{DeSh}$ is varied with the shaping rate $R_{Sh}$ for transmission rate adaptivity according to the parameter controller 141 depending on the channel. The shaping rate is not greater than m−1, which corresponds to a uniform shaping, and the de-shaped sequence is always not longer than shaped sequence, i.e., $L_{DeSh} \leq L_{Sh}$.

The post-shaping FEC layer 230 further appends additional overhead with parity bits to protect the channel noise. In some embodiments, the post-shaping FEC layer uses a concatenation of a powerful soft-decision (SD) code and a low-complexity hard-decision (HD) code. For example, the SD FEC code is a family of capacity-achieving codes, such as low-density parity-check (LDPC) codes, turbo convolutional codes, turbo block codes, polar codes, and staircase codes. The HD FEC code includes a family of algebraic codes, such as Hamming codes, quasi-cyclic codes, Reed-Muller codes, Reed-Solomon codes, and BCH codes. The HD FEC code first appends the parity bits 231 to guarantee minimum Hamming distance at a small overhead. Then the SD FEC code appends additional parity bits 232 to improve the coding gain. The overall code rate of the post-shaping FEC layer is lower-bounded by $$R_{Sh}^{Post} = R_{LDPC}^{Post} R_{BCH}^{Post} \geq \frac{m-1}{m}$$

where equality holds when all sign bits are used as parity bits of post-shaping FEC codes. Here, $R_{LDPC}^{Post}$ and $R_{BCH}^{Post}$ denote the code rates of SD FEC (e.g., LDPC code) and HD FEC (e.g., BCH code), respectively, for the post-shaping FEC layer.

To have higher code rates (i.e., lower overhead), some information bits (referred to as unshaped bits) 221 are carried out on signs of amplitudes. In such embodiments, the code rate is specifically defined as follows:

$$R_{Sh}^{Post} = \frac{m-1+\gamma}{m}$$

where $0 \leq \gamma \leq 1$ specifies the relative amount of the unshaped bits. The length of unshaped bits is $L_{UnSh} = \gamma L_{Sh}/(m-1)$ and the length of parity bits is $L_{Par} = (1-\gamma)L_{Sh}/(m-1)$ as depicted in the effective frame structure 240.

Shaping Layer

Figure 3:
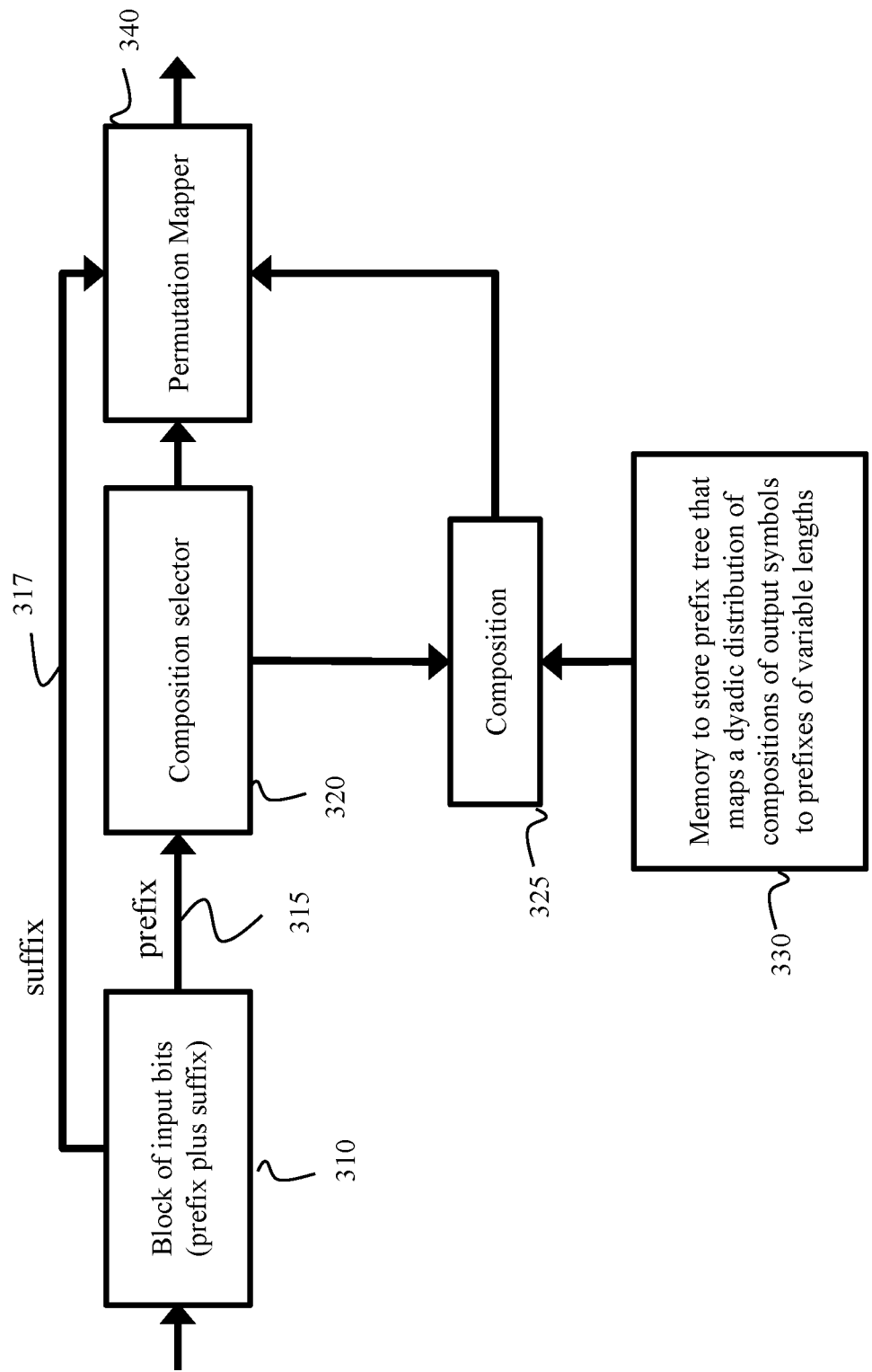
FIG. 3 illustrates a block diagram of an exemplar shaping mapper of the system according to some embodiments.

FIG. 3 illustrates a block diagram of the shaping mapper 113 according to some embodiments. The method and system for the shaping mapper take the input block of bits 310 including a prefix 315 followed by a suffix 317. The prefix and the suffix may be of variable length, but total to the length of the input block of bits 310. In some embodiments, the length of the suffix is governed by the length of the prefix. For example, if the length of the input block of bits is 10 bits, and the length of the prefix is three bits, then the length of the suffix is seven bits. For another example, if the length of the input block of bits is 10 bits, and the length of the prefix is two bits, then the length of the suffix is eight bits.

The shaping mapper also includes a memory 330 configured to store a prefix tree that maps a dyadic distribution of compositions of output symbols (amplitude alphabets) to prefixes of variable lengths. A path from a root node of the prefix tree to each leaf of the prefix tree is defined by a prefix formed by a unique sequence of binary values of a length that is equal to a depth of the leaf. In such a manner, a composition selector 320 may select a composition 325 identified in the prefix tree by a prefix 310 in the input block of bits.

As used herein, the prefix tree is a full binary tree such that every node has two children and each branch is associated with either 0 or 1 value, such that a path from a root node to each leaf is defined by unique sequence of binary value referred herein as a prefix or prefix code or Hufmann code. Each leaf of the prefix tree is associated with a composition. The compositions in the prefix tree may be unique or may have multiple occurrences. The path from the root node to the leaf node may be of variable length in dependence of the depth of the leaf in the prefix tree. The path to the leaf and/or its depth defines the length of the prefix 315 and accordingly the length of the suffix 317.

Each leaf in the prefix tree is associated with a composition, such as a composition 325, that has at least a number of unique permutations equals two in a power of a length of a suffix defined by a difference between the length of the block of input bits and the length of the prefix of the leaf. For example, a composition associated with a leaf with a depth five has at least two in a power of five possible unique permutations. The composition may have more than the two in a power of five possible unique permutations, but not less.

As used herein, a composition is a multiset of symbols of the alphabet of the output block of symbols. For example, an exemplar composition C of alphabet "abcd" may be described as a multiset C={a,a,a,a,b,b,b,c,c,d} where 'a', 'b', 'c' and 'd' are different symbols of the amplitude alphabet. The cardinality of compositions is finite and equals to the length of the output block of symbols. The cardinality of the multiset C is 10 for this example. As used herein, a permutation of a composition is a unique ordering of symbols of the composition. For example, a permutation of a multiset C={a,a,a,a,b,b,b,c,c,d} may be received by changing the location of last two symbols to receive a permutation {a,a,a,a,b,b,b,c,d,c}.

To that end, the method and system of the shaping mapper uses a processor configured to execute a composition selector 320 to select a composition 325 identified in the prefix tree by a prefix 315 in the input block of bits and to execute a permutation mapper 340 to permute the selected composition 325 according to a suffix 317 in the input block of bits.

For example, in one embodiment, the permutation mapper permutes the selected composition using an arithmetic coding for a constant-composition distribution matching (CCDM), wherein the suffix in the input block of bits is an input vector to the arithmetic coding. In another embodiment, the permutation mapper permutes the selected composition using a multiset ranking mapping between the input block of bits and the permuted composition. In another embodiment, the permutation mapper permutes the selected composition using at least two parallel binary mappings between at least two subsets of the input block of bits and at least two binary permutations of the composition. In such a manner, the shaping mapper of some embodiments allows for efficient mapping between different blocks of input bits and blocks of output symbols for a specified composition.

In such a manner, some embodiments transform an input sequence of symbols with equiprobable, i.e., uniform, distribution of values of bits into an output sequence of symbols with values of bits with desired non-uniform distribution. Some embodiments select sequences bounded by a certain energy, and group those sequences by composition, where each composition has a number of possible unique permutations. In such a manner, the desired total distribution of the symbol set is achieved by using a number of smaller sets which do not individually have the desired distribution, but have an average distribution which is equal to the desired distribution. In some embodiments, the distribution is defined by an approximation of the distribution of sequences within a determined energy bound.

Specifically, some embodiments are based on realization that the input sequence of symbols may be transformed on block-by-block bases. For example, some embodiments transform a block of bits with uniform distribution of values of bits into a block of shaped bits with a non-uniform distribution of values of bits. Some embodiments are based on realization that by considering the set of sequences within a sphere as a set of compositions, it may reduce the complexity of mapping and demapping, by introducing structure. For example, when a set of compositions with numbers of permutations {18,33,24} respectively is considered, by using only a subset of these permutations, in order to achieve numbers of permutations of {16,32,16} in total. While this method reduces the total number of sequences which are addressed by the algorithm (and therefore increase rate-loss), it also has a dyadic distribution, which enables the use of a prefix code, which allows the use of a binary address for each composition without any additional rate loss. The problem of encoding and decoding to and from an arbitrary number of sequences with bounded energy may therefore be reduced to two independent algorithms: selecting a composition with appropriate energy and frequency; and selecting the appropriate permutation of the desired composition. This realization allows different embodiments to combine distribution matching with different sets of compositions, with the probability of selection of different compositions, to achieve the design flexibility of transmission with an overall distribution which approximates that determined by an ideal sphere bound.

In some embodiments, select compositions in the dyadic distribution of compositions to reduce one or combination of energy and kurtosis of transmission. For example, by including all permutations with energy lower than that specified by the energy bound, the set of included permutations provides the maximum number of sequences for an average energy given the per-dimension cardinality. By including a maximum kurtosis, the total number of permutations in the distribution matcher for specified bounds in energy and kurtosis may be maximized. Hence, the resulting distribution matcher having all these permutations is Pareto optimal in the sense of having the lowest possible rate-loss at a given average energy, kurtosis and sequence length, for a specified per-dimension cardinality of a block of input bits.

To that end, some embodiments select a number of possible permutations for each composition as a power of two resulting in the minimum total energy of the selected permutations of the compositions. By having a number of permutations for each composition as a power of two allows us to use the Huffman code to map at least a part of a codeword to a composition in a set of possible compositions without rate loss. The remaining part of the codeword is optionally used to select a permutation within the composition.

Figure 4:
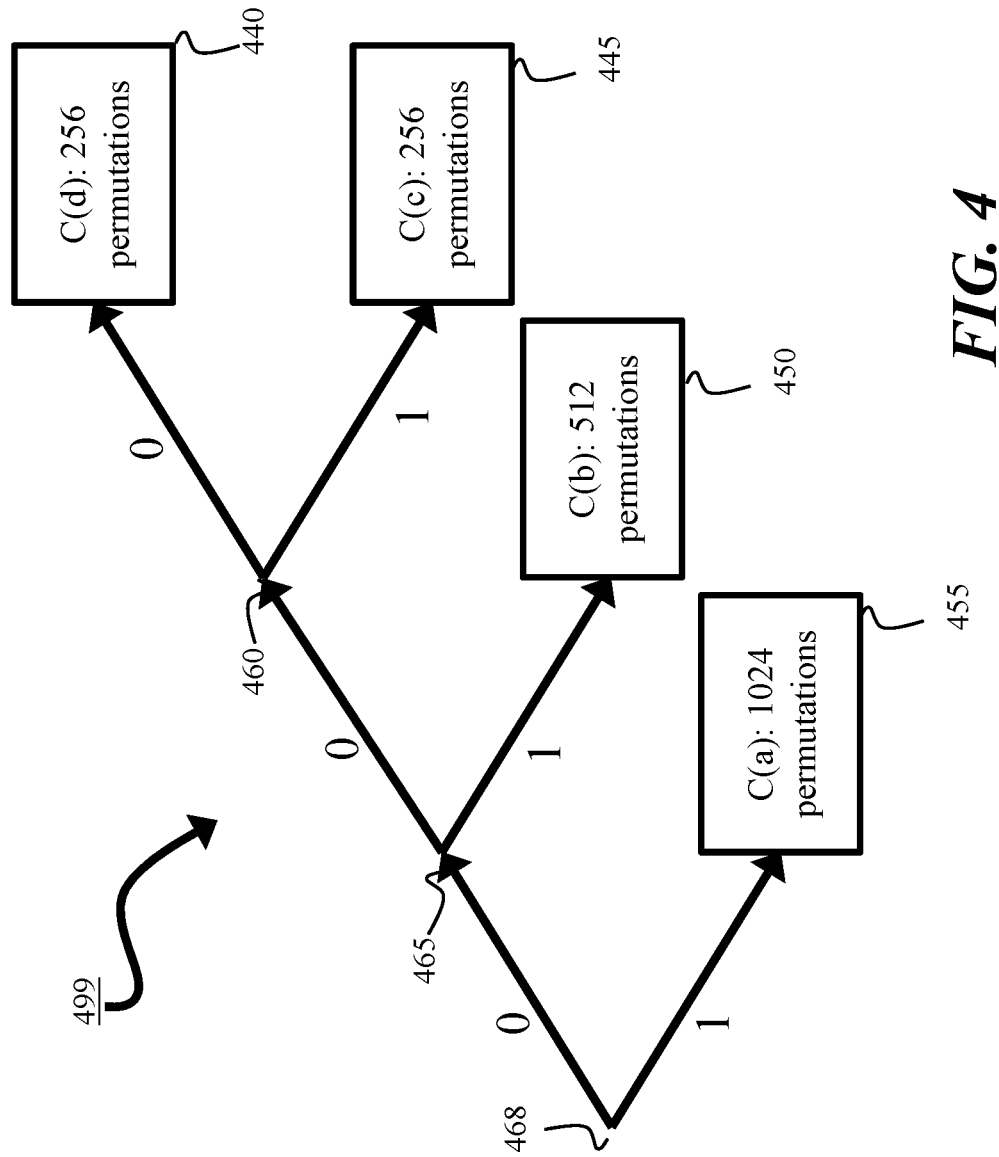
FIG. 4 illustrates a schematic of exemplar prefix tree used by some embodiments for selecting a composition according to a variable length prefix in some embodiments.

FIG. 4 shows a schematic of an exemplar prefix tree according to some embodiments for selecting a composition with a variable length prefix. During the shaping operation, the prefix tree 499 is stored in the memory 330. Leaves 440, 445, 450, 455 of the prefix tree are associated with the compositions. The composition is selected using the prefix bits as read from the first node in the tree 468. At each node in the tree 468, 465, 460, a bit in the prefix is used to select one of the branches available according to the bit label of the branch. This process is repeated until one of the leaves is reached.

The number of bits in the prefix added to the number of bits represented by the number of permutations in each leaf is constant, and equal to the input bit block length. Specifically, a prefix tree is a full binary tree such that every node has two children and each branch is associated with either 0 or 1 value, such that a path from a root node 468 to each leaf 440, 445, 450, 455 is defined by a unique sequence of binary value referred herein as a prefix or prefix code or Huffman code. Each leaf of the prefix tree is associated with a composition. The compositions in the prefix tree may be unique or may have multiple occurrences. Various source coding techniques such as those described herein may be used to determine an optimal labeling for the prefix for a variable length prefix.

The prefix tree 499 stores a dyadic distribution of compositions such that the PMF of each composition in the dyadic distribution is two in a power of −N. By way of construction, each composition is represented in the dyadic distribution of compositions with power of two numbers of its permutations. In addition, a total number of permutations in the dyadic distribution of compositions should also be a power of two.

In cases when each composition in the prefix tree have a unique occurrence, each leaf in the prefix tree is associated with a composition that have at least a number of unique permutations equals two in a power of the length of a suffix defined by a difference between the length of the block of input bits and the length of the prefix defined by the depth of the leaf. For example, the depth of the leaf 440 is three and the path to the leaf 440 is {000}. Similarly, the depth of the leaf 445 is three and the path to the leaf 440 is {001}. When the first three bits in the input block of bits are {000}, the leaf 440 is selected, such that the length of the suffix is 8 when the length of the input block of bits is 11. Two in a power of eight gives 256 possible permutations. Hence, the composition associated with the leaf 440 has at least 256 possible permutations according to some embodiments.

The depth of leaf 455 is one leaving 10 bits to the suffix to permute the combination associated with the leaf 455. To that end, the combination associated with leaf 455 has at least 1024 permutations according to some embodiments. Note that permutations of leaf 455 may be in theory used for the leaf 440. However, if the composition of the leaf 440 does not have 1024 unique permutations, such a composition cannot be associated with the leaf 455.

Furthermore, some embodiments are based on the realization that by imposing a structure on the sphere-bound distribution matcher, simplified encoding and decoding may be realized at a small penalty in rate-loss. For example, if the distribution of the number of permutations in each composition is dyadic, communication system may use a Huffman code without additional loss to select a composition, and then use encoding and decoding techniques for constant-composition distribution matching (CCDM). Alternatively, the shaping mapper is realized by a Huffman-coded sphere shaping, a shell mapping, a multi-set partition distribution matching, a hierarchical distribution matching, an enumerative sphere shaping, a look-up table and a combination thereof, to determine the series of amplitude symbols given the pre-shaping bits for matching the PMF for a set of amplitude symbols to a target distribution.

Post-Shaping FEC Layer

The shaped symbols by the shaping mapper 113 may be uniquely inverted by the shaping demapper 133, which employs the inverse operation of the distribution matching such as the Huffman encoding based on the prefix tree in some embodiments. However, the successful operation of the shaping demapper requires error-free shaped symbols, and hence the error control with the post-shaping FEC coding layer (i.e., post-shaping encoder 114 and post-shaping decoder 132) is necessary to compensate for the potential channel noise. In some embodiments, SD FEC coding based on capacity achieving codes is used. For example, the post-shaping error-correction code is a family of low-density parity-check (LDPC) codes, turbo convolutional codes, turbo block codes, polar codes, staircase codes, or a variant thereof. In some embodiments, the post-shaping FEC encoder uses a generator matrix in an algebraic Galois field to append overhead parity bits, whereas the post-shaping FEC decoder reconstructs the original data by correcting potential errors in the encoded bits via SD decoding algorithms such as a maximum-likelihood (ML) decoding, a maximum a posteriori (MAP) decoding, an iterative belief propagation (BP) decoding, an ordered statistics decoding (OSD), a list decoding, or a variant thereof. For example, the BP decoding uses an iterative message passing rule such as sum-product operations across a code bipartite graph given a soft-input message such as a log-likelihood ratio (LLR) information.

The SD FEC coding such as LDPC codes may asymptotically achieve the channel capacity when the codeword length is large enough and the coding rate is no greater than the Shannon limit of the communication channel. However, finite-length and short-length FEC codes have considerably compromised performance especially when the decoding algorithm is simplified, e.g., with the fewer number of BP decoding iterations, for latency and power-constrained systems. In addition, typical SD FEC coding has relatively small minimum Hamming distance, causing higher error floors due to the ML bound.

To compensate for residual errors of the SD FEC coding, the post-shaping FEC code layer in some embodiments further uses a serial concatenation of hard-decision (HD) coding and soft-decision (SD) coding, wherein the HD FEC coding is based on Reed-Solomon codes, Bose-Chaudhuri-Hocquenghem (BCH) codes, Reed-Muller codes, quasi-cyclic codes, Hamming codes, or a variant thereof. Using the HD FEC concatenation with the SD FEC coding, the post-shaping FEC layer may significantly reduce the probability of failure for the shaping layer. Even with a small overhead (e.g., 1%) for the HD FEC codes, the error floors of the SD FEC coding may be greatly decreased because of the increased minimum Hamming distance. In addition, the HD FEC coding has a practical benefit in computational complexity and power consumption compared to the SD FEC coding.

For example, some embodiments of the invention use a concatenation of LDPC codes and BCH codes [n, k, t], where n denotes the length of the BCH codeword ($n=2^s-1$ for a positive integer of s), k is the information length within the BCH codeword ($k=n-t\cdot s$), and t is the error correction capability of the code. The BCH code rate is defined as $$R_{BCH} = \frac{k}{n} = \frac{n-s\cdot t}{n}$$

while the corresponding overhead of the post-shaping BCH code is expressed as $$OH_{BCH} = \frac{1-R_{BCH}}{R_{BCH}} = \frac{s\cdot t}{n-s\cdot t}.$$

The BCH codeword is efficiently decoded by decoding algorithms including a syndrome-based decoding. The BCH code may correct all errors if the number of error bits is at most t bits within the BCH codeword block.

A probability that l bit errors occurs within a codeword may be expressed with a binomial distribution as follows:

$$P_{err}(l) = \binom{n}{n-l}(1-BER_{in})^{n-l}(BER_{in})^l$$

where $BER_{in}$ is the input BER for the BCH code. Output BER after the BCH code may be calculated as follows:

$$BER_{out} = \frac{1}{k}\sum_{l>t} l \times P_{err}(l)$$

For the concatenated LDPC and BCH codes, the post-shaping output BER is identical to the output BER of the BCH code, i.e., $BER_{Sh}=BER_{out}$, and the input BER to the post-shaping BCH code is the output BER of the post-shaping LDPC code, i.e., $BER_{in}=BER_{LDPC}$.

Pre-Shaping FEC Layer

The post-shaping FEC layer using the concatenated SD and HD FEC codes enables a high chance of successful deshaping in practice. However, any finite-length finite-complexity FEC codes have a non-zero probability of errors. More importantly, such a potential error after the post-shaping FEC decoding may cause catastrophic burst errors in PAS systems because any single bit error within the shaping block may highly interfere with the whole shaping bits due to the prefix tree inconsistency. This burst error issue is more significant when the shaping length is increased to compensate for the rate-loss penalty.

A probability that at least one bit error occurs in the shaped sequence (before the shaping demapping) may be calculated as follows:

$$P_{err}^{ShSeq} = 1-(1-BER_{Sh})^{L_{Sh}} \approx BER_{Sh} \cdot L_{Sh}$$

where $BER_{Sh}$ is the bit error rate (BER) at the output of the post-shaping FEC decoder. The above expression explains one of major issues of the reverse concatenation using the post-shaping FEC layer for PAS: more specifically, the BER is enhanced by the length of the shaping length $L_{Sh}$ after the shaping demapper, causing long burst errors. This issue is called the BER enhancement in PAS systems.

In the presence of un-shaped bits, the total BER after de-shaping via the shaping demapper is a combination of enhanced BER of shaped bits and non-enhanced BER of un-shaped bits as expressed below:

$$BER_{DeSh} = \frac{L_{DeSh}BER_{DeSh}^{Sh} + \gamma L_{Sh}BER_{DeSh}^{UnSh}/(m-1)}{L_{DeSh} + \gamma L_{Sh}/(m-1)}$$

where $BER_{DeSh}^{UnSh} = BER_{Sh}$ and the enhanced BER after de-shaping may be expressed as:

$$BER_{DeSh}^{Sh} = p \times P_{err}^{ShSeq} \approx p \times BER_{Sh} \times L_{Sh}$$

where p is the probability of bit flipping in a burst after deshaping. Note that lower shaping rate reduces the length of the bursts after de-shaping, while the number of de-shaped sequences within the same observation window increases. Therefore, $BER_{DeSh}^{Sh}$ is independent of $L_{DeSh}$ and, hence, the shaping rate. Nevertheless, longer shaping lengths cause more serious BER enhancement.

To compensate for the BER enhancement, the conventional PAS systems based on the reverse concatenation require to use more powerful post-shaping FEC codes at a cost of higher-power operations and longer latency. Some example embodiments provide a way to resolve the issue by introducing a dual concatenation, where the pre-shaping FEC layer (i.e., the pre-shaping encoder 112 and decoder 134) is used as well as the post-shaping FEC layer (i.e., the post-shaping encoder 114 and decoder 132) for the PAS systems (i.e., the shaping mapper 113 and demapper 133). In such a manner, the post-shaping FEC coding may be greatly simplified by the additional error control with the pre-shaping FEC coding. The pre-shaping FEC coding is mainly aimed at mitigating the catastrophic burst errors after the deshaping, while the post-shaping FEC coding is aimed at mitigating the channel noise.

In some embodiments, the pre-shaping FEC coding uses burst error-correcting codes based on binary cyclic codes called fire codes. The fire codes may correct any single burst error of length l bits with a generator polynomial when it holds:

$$k \le n - 3l$$

where k is the net amount of information bits (also as known as payload), and n is the codeword length of the fire codes. The fire codes append 3-fold longer overhead parity bits than the length of the single burst error. The overhead is slightly longer than the theoretical bound of burst error capability known by Rieger's bound: $k \le n - 2l$. Hence, the fire codes require about 30% higher overhead than the Rieger bound, whereas the fire codes are relatively simple as binary cyclic codes.

Additionally or alternatively, some embodiments use non-binary codes based on Reed-Solomon (RS) codes for the burst-error protecting pre-shaping FEC codes. The Reed-Solomon codes achieve the theoretical Singleton bound: $k_s \le n_s - 2l_s$, where $k_s$ is the payload size in symbols, $n_s$ is the codeword length in symbols, $l_s$ is the number of error symbols, and s is the nonbinary alphabet size. The symbol lengths and bit lengths may be converted as $l_s = 1 + \text{floor}((l+s-2)/s)$, where floor(.) is the floor function providing the maximum integer no greater than the argument value. Hence, the Reed-Solomon code provides an excellent burst error correction capability, approaching the Rieger bound depending on the symbol size s. Although the RS codes are relatively simpler than the SD FEC codes, they are still more complicated than binary HD FEC coding. In addition, there is a low degree of freedoms to choose the symbol size, the codeword length, and the code rate.

Yet another embodiment uses random error-correcting codes with interleaving, e.g., BCH codes with a block interleaving, for the pre-shaping FEC coding layer to enhance a burst error correction capability. The block interleaving may spread the burst errors among multiple codewords, such that short codes with reduced error correcting ability may be used. Specifically, for the burst of length l bits, $L_{Int}$-way interleaving may use an $L_{Int}$-fold shorter code with a relaxed error correcting ability of $l/L_{Int}$, rather than a long BCH code for l-error correcting ability. When the interleaving order equals the burst length ($L_{Int}=l$), the pre-shaping FEC layer may be realized with a fully-parallel structure.

Figure 5:
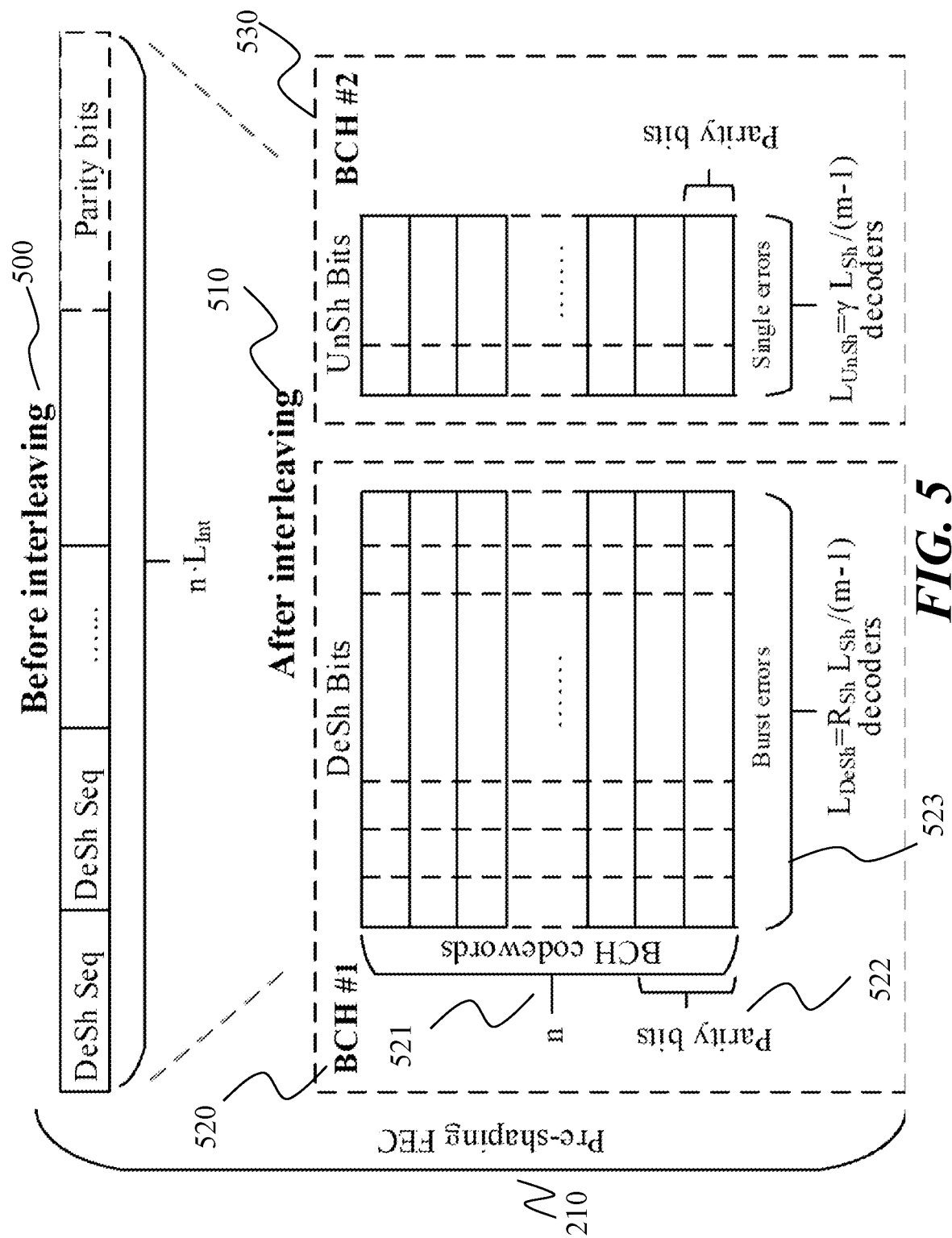
FIG. 5 illustrates a schematic of exemplar coding structure for parallel pre-shaping BCH codes with block interleaving according to some embodiments.

FIG. 5 illustrates an exemplar schematic of the parallel BCH structure based on block interleaving of shaping sequences for pre-shaping FEC coding according to some embodiments. For example, the interleaving 510 is performed in the following manner: input bits 500 are written sequentially in rows 523 of length $L_{Int}$ and output bits are read sequentially from columns 521 of length $n = n'/L_{Int}$. Each column is a codeword of a short BCH code of length n, appending parity bits 522. In this manner, this structure enables parallel encoding and parallel decoding, suited for high-throughput systems.

In some embodiments, the fully parallel structure utilizes $L_{Int} = L_{DeSh} + L_{UnSh}$, for $L_{Int}$-way interleaving, where two sets of parallel BCH codes 520, 530 are used respectively for deshaping bits and unshaped bits. The fully-parallel/interleaved structures in the pre-shaping FEC coding may substantially improve burst error correction ability, approaching the Hamming bound. While random error correction approaches are in general less efficient for burst error correction than the fire codes or Reed-Solomon codes, the parallel BCH code may offer low complexity, scalability, low latency, and ability to correct multiple bursts. In addition, the parallel BCH codes may increase the encoding/decoding throughput with a parallel implementation.

Furthermore, this structure with parallel BCH and block interleaving may be easily scaled according to the shaping rate. For example, the parallel structure in FIG. 5 is initially designed for the maximum shaping rate (i.e., for $L_{DeSh} = L_{Sh}$). Then, an adaptability is realized by subsequently disabling some of parallel BCH encoders/decoders. Also, for shaped and unshaped bits separate BCH codes 520, 530 may be used, since the requirement for error correcting ability may be different: for unshaped bits there is no BER enhancement and, hence, BCH code with reduced error correcting ability may be used to minimize the overall overhead.

More importantly, the required code overhead may be decreased by increasing interleaving/parallelization order for BCH code. In particular, the required overhead for fully-parallel BCH codes is matched with the Hamming bound.

A probability that T errors occur in each parallel codeword (equivalently, T bursts of length $L_{DeSh}$ within non-interleaved structure of length $n \cdot L_{DeSh}$) may be calculated using a binomial distribution PMF as follows:

$$P_{burst}(T) = \binom{N_{seq}}{N_{seq}-T}(1-P_{err}^{ShSeq})^{N_{seq}-T}(P_{err}^{ShSeq})^T$$

where $N_{seq}$ is the number of de-shaped sequences within non-interleaved structure (which equals to the length of the code n in the case of full interleaving). Further, considering that a probability of flipped bit in a burst is p, a probability, that l flipped bits occur in a parallel codeword when T bursts occur, may be expressed using a binomial distribution PMF as follows:

$$P_{flip}(l,T) = \binom{T}{T-l}(1-p)^{T-l}(p)^l$$

for $l \leq T$. Accordingly, an output BER for the pre-shaping BCH code may be calculated as follows:

$$BER_{out} = p \cdot P_{err}^{ShSeq} \cdot \frac{1}{k} \sum_{l \leq t} l \cdot \sum_{T=0}^{N_{seq}} P_{flip}(l,T) P_{burst}(T)$$

where the first term represents an enhanced post-shaping demapper $BER_{DeSh}^{Sh}$.

The above expression is applicable for the pre-shaping BCH code for shaped bits, while the BER of the BCH code for the unshaped bits is equivalent to that of the post-shaping BCH code.

Transmission Rate

The transmission rate in bits per 1-dimensional symbol (b/1D) for conventional PAS systems with the reverse concatenation (i.e., without pre-shaping FEC layer but only post-shaping FEC layer) may be expressed as $R_{Tr} = R_{Sh} + \gamma$, where $\gamma = 1 - m(1 - R_{FEC}^{PostSh})$. For PAS with dual concatenation FEC based on BCH codes in pre-shaping FEC layer according to some of embodiments, the transmission rate is expressed as follows:

$R_{Tr} = R_{Sh} \cdot R_{BCH}^{PreSh} + \gamma \cdot R_{BCH}^{PreSh'}$, where $R_{BCH}^{PreSh}$ is the rate of the pre-shaping BCH code for shaped bits, and $R_{BCH}^{PreSh'}$ is the rate of the pre-shaping BCH code for unshaped bits.

It is noteworthy that post-shaping coding is performed on bit sequences with extended length due to shaping, while pre-shaping coding is done on shorter bit sequences. Furthermore, in general, post-shaping coding is less efficient compared to pre-shaping coding, since not of the full alphabet of bit sequences of length $L_{Sh}$ is utilized for signalling, however, coding protects all possible sequences of that length which results in extra parity bits and increased overhead.

Next, the adjusted overheads for pre-shaping BCH codes are considered such that the transmission rate for the lowest considered shaping rate ($R_{Sh}=1$ b/Amp) is matched to the case with post-shaping BCH code—the overhead of the BCH code for shaped bits is twice higher, while overhead of the BCH code for unshaped bits is the same. Hence, error correcting ability of pre-shaping BCH codes may be increased compared to post-shaping BCH code, while targeting the same (or at least not lower) transmission rate.

Background Block Error Rate (BBER)

In some embodiments, minimizing a block error rate or its variant is of importance besides maximizing the transmission rate and minimizing BER. For example, optical transport network (OTN) framing for systems operating beyond 100 Gbit/s—optical transport unit Ck (OTUCk) framing, where Ck index refers to the approximate bit-rate of k×100 Gbit/s, is defined in International Telecommunication Unit Telecommunication standardization Sector (ITU-T) G.709 standard. The length of OTUCk frames is $L_{OTU}=130,560 \times k$ bits (4,080×4 k bytes). We note that FEC for the OTUCk signals is interface/vendor specific and not included in the OTUCk definition in ITU-T G.709 standard. The performance of systems with OTN framing is evaluated using a background block error rate (BBER) and a severely errored second rate (SESR). Severely errored second is a one-second period which contains more than 15% errored frames. BBER is the ratio of errored OTU frames to the total number of transmitted frames, excluding those occurred during severely errored seconds.

OTUCk frames may consist of multiple de-interleaved blocks, which consist of multiple pre-shaping BCH codewords. In such case, output BBER after de-shaping and pre-shaping decoding may be calculated as follows:

$$BBER = 1 - [P_{err}^{PreSh}(l \leq t) \times P_{err}^{PreSh'}(l \leq t)]^{N_{block}^{OTU}}$$

where $N_{block}^{OTU} = L_{OTU}/(nL_{DeSh}+nL_{UnSh})$ is the number of de-interleaved blocks, $P_{err}^{PreSh}(l \leq t)$ is the probability of decoding success of the pre-shaping BCH code for shaped bits and $P_{err}^{PreSh'}(l \leq t) = P_{err}(l \leq t)^{L_{UnSh}}$ is the probability of decoding success of the pre-shaping BCH code for unshaped bits.

Optimal Dual Concatenation

Some example embodiments are also based on a recognition that the dual concatenation of the pre-shaping FEC and post-shaping FEC codes provides an additional degree of freedom in selection of overheads to protect against different error patterns for the PAS systems. The conventional reverse concatenation with only the post-shaping FEC layer may only correct the random errors due to the channel noise, while the forward concatenation with only the pre-shaping FEC layer may only correct the burst errors due to the failure of the shaping layer. By using the dual concatenation according to some example embodiments, the protection against different error patterns may be adaptively and seamlessly controlled.

For example, FIG. 6A shows exemplar configurations 611 to choose the overhead for the post-shaping BCH code 612, the overhead for the pre-shaping BCH code for the deshaping bits 613, and the overhead for the pre-shaping BCH code for the unshaped bits 614. The A1-A6 configurations 610 are for the block length of n=4095, and the B1-B10 configurations 620 are for n=8191 in some embodiments. For some cases, we may use A1 or B1 configurations, which correspond to the conventional forward concatenation with the only pre-shaping FEC codes. While the A6 and B10 configurations correspond to the conventional reverse concatenation with the only post-shaping FEC codes, where the overheads of the pre-shaping FEC codes are zero. The present invention provides the benefit to seamlessly adjust the balance of the overheads for the pre-shaping and post-shaping FEC layers without sacrificing the overall transmission rates 615. In fact, the transmission rates may be slightly increased by dual-concatenation configurations A2-A5 and B2-B9.

Figure 6B:
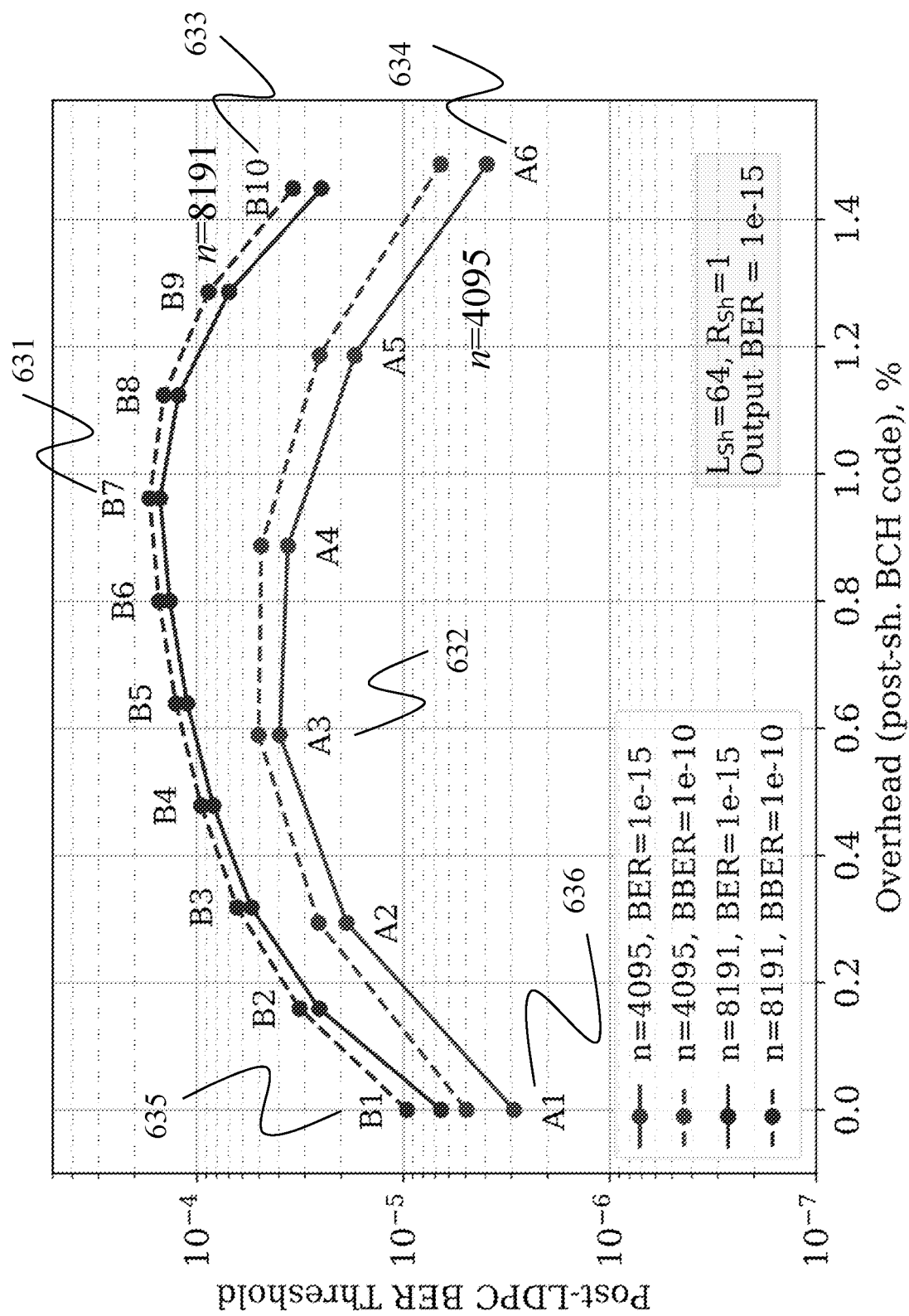
FIG. 6B illustrates exemplar performance improvements with the balanced dual-concatenation configurations to reduce the complexity of soft-decision pre-shaping codes according to some embodiments.

Furthermore, the balanced overheads with dual concatenation may provide a non-obvious performance improvement. This is shown in FIG. 6B, where the required LDPC performance to achieve a target system performance (e.g., a system BER target of $10^{-15}$ or a system BBER target of $10^{-10}$) is plotted as a function of the overhead for the post-shaping FEC layer. By adjusting the overheads of the pre-shaping and post-shaping HD FEC codes, the requirement of the post-shaping SD FEC codes may be greatly relaxed: specifically, the dual-concatenation B7 and A3 configurations 631, 632 may significantly outperform the reverse-concatenation B10 and A6 configurations 633, 634 and the forward-concatenation B1 and A1 configurations 635, 636, by an order of magnitude.

Figure 6C:
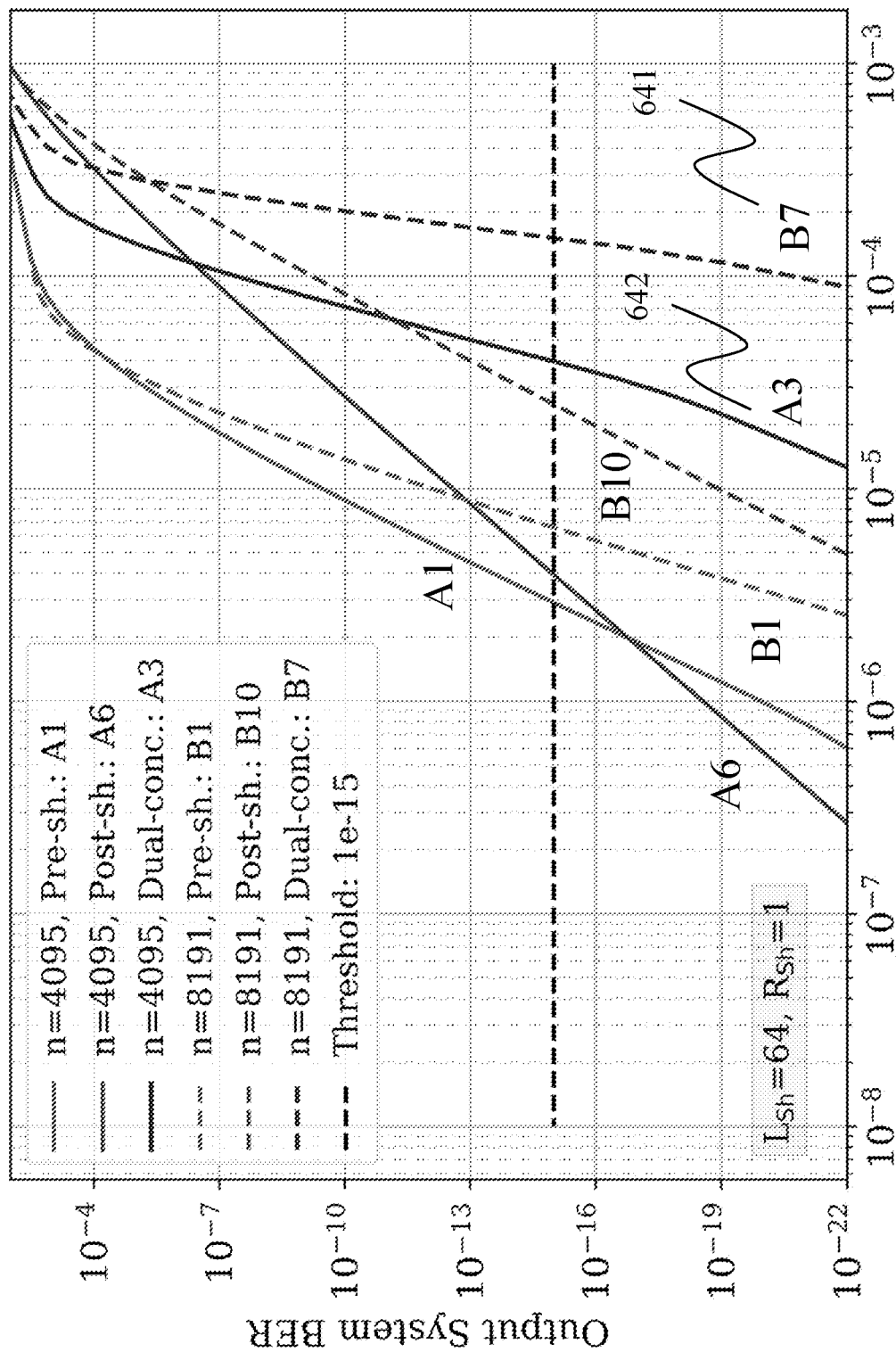
FIG. 6C illustrates exemplar performance improvements with the balanced dual-concatenation configurations as a function of the pre-shaping soft-decision decoding performance according to some embodiments.

In addition, the performance improvement by the present invention may be more significant when the target system performance is more stringent because of the non-obvious gain in the error exponent increase. FIG. 6C shows the system BER for the reverse concatenation A6 and B10, the forward concatenation A1 and B1, and the dual concatenation A3 and B7, as a function of the post-shaping LDPC BER. The performance of the dual-concatenation configurations 641, 642 may achieve steep BER performance than the conventional reverse and forward concatenations. Furthermore, the present invention provides non-obvious gains in adjustable lower complexity, lower latency, and higher throughput with parallel and shorter BCH codes. Specifically, the dual-concatenation BCH coding may significantly decrease the required complexity of the post-shaping LDPC coding, e.g., with fewer BP decoding iterations. In such a manner, this architecture of the invention offers a high flexibility for shaping rate adaptation and potentially reduced implementation complexity.

Parallel Processing

FIG. 7A shows an example of highly parallel and pipelined implementation of the pre-shaping FEC and post-shaping FEC encoder 700 for high-throughput transmission according to some embodiments. As each base encoder 702 has a shorter codeword, the encoding may be accomplished with fewer clocks to encode. In this manner, the encoding is highly parallelized for all incoming bits to generate a large codeword at a small number of clocks. Accordingly, the highly parallel implementation may improve the effectiveness of the encoding process of the source data and enhance the performance of the processor (hardware processor) in a transmitter, increasing the throughput of the transmitter.

FIG. 7B illustrates an example of highly parallel and pipelined implementation of the pre-shaping FEC and post-shaping FEC decoders for high-throughput processing according to some embodiments of the invention. For example, the BCH decoder 710 is fully parallelized for Q=256 short decoders 712, with a block interleaving. Each decoder takes message to decode 711 to generate the hard-decision decoded message 714. Some embodiments further use pipelining the same decoding process with additional decoders 720 to increase the decoding throughput. For example, the first round of decoding process is performed at the first set of parallel decoders 710, and the second round of decoding process is performed at a second set of Q-parallel decoders 720. Further pipelines are un-rolled to the pipelined decoders over serialized interconnects 723. Note that each decoder 712, 722 may be processed in parallel without extra complexity. The capability of parallel and pipeline implementation is a great benefit the dual-concatenated coding structure with interleaving for high-throughput transceivers. Accordingly, the implementation of the decoders may improve the effectiveness of the decoding process of codewords and enhance the performance of the processor (hardware processor) in a receiver, increasing the throughput of the receiver.

OTHER FEATURES

Figure 8A:
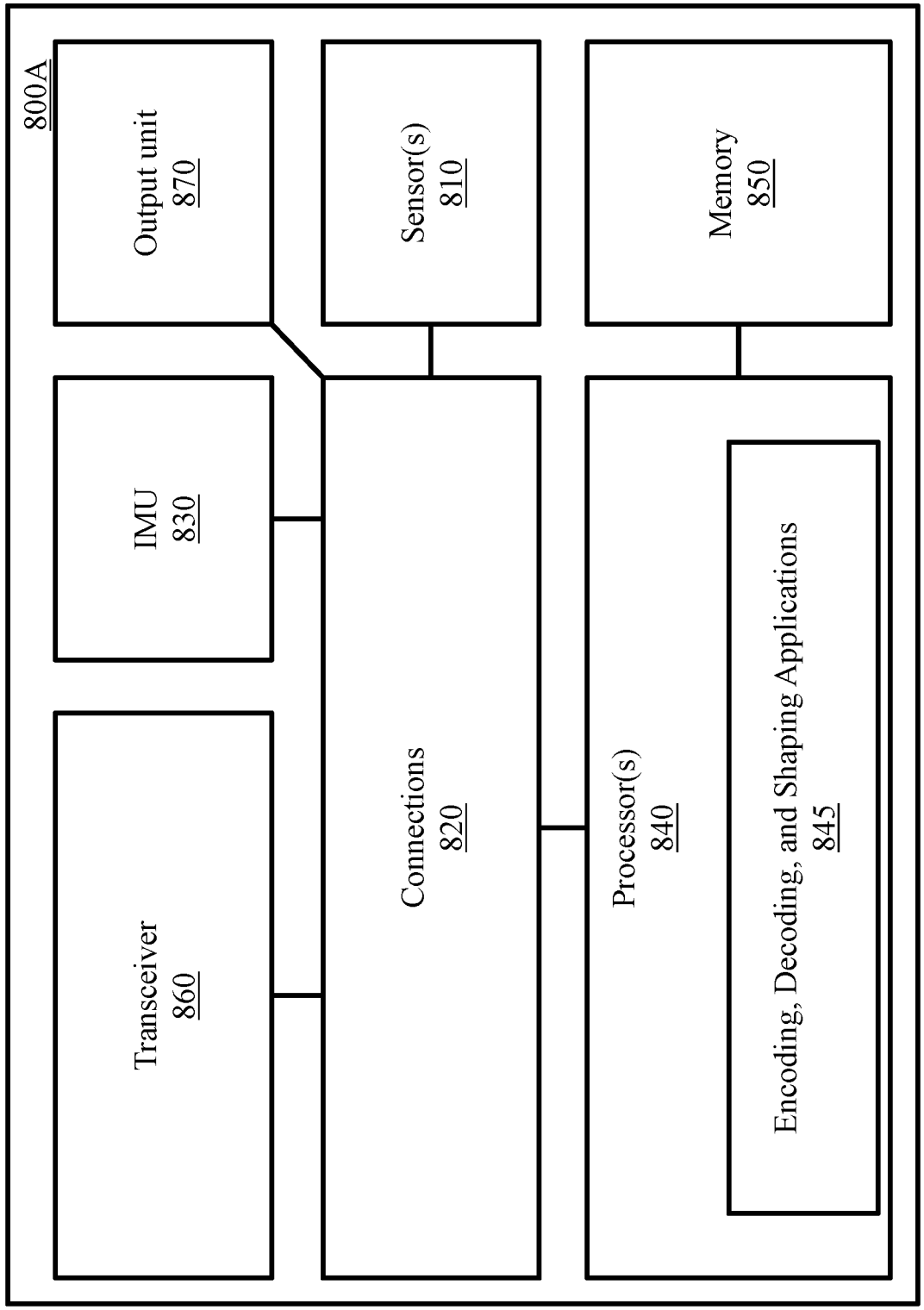
FIG. 8A is a block diagram of a system for implementing different components of the receiver for performing the dual-concatenated decoding and deshaping according to some embodiments and/or the transmitter for the dual-concatenated encoding and shaping according to some embodiments.

FIG. 8A illustrates an exemplar block diagram of a system suitable for implementing different components of the receiver for performing the decoding and deshaping according to some embodiments and/or the transmitter for encoding and shaping the codeword according to some embodiments. The system 800A may include one or combination of a sensor 810, an inertial measurement unit (IMU) 830, a processor 840, a memory 850, a transceiver 860, and an output unit 870 such as a display/screen and/or a speaker, which may be operatively coupled to other components through connections 820. The connections 820 may comprise buses, lines, fibers, links or combination thereof.

The transceiver 860 may, for example, include a transmitter enabled to transmit one or more signals over one or more types of communication networks and a receiver to receive one or more signals transmitted over the one or more types of communication networks. The transceiver 860 may permit communications with wired or wireless networks based on a variety of technologies such as, but not limited to, femtocells, Wi-Fi networks or wireless local area networks (WLANs), which may be based on the IEEE 802.11 family of standards, wireless personal area networks (WPANS) such as Bluetooth, near field communication (NFC), networks based on the IEEE 802.11 family of standards, and/or wireless wide area networks (WWANs) such as LTE, WiMAX, etc. The system may also include one or more ports for communicating over wired networks such as fiber-optic communications.

In some embodiments, the processor 840 may also receive input from IMU 830. In other embodiments, the IMU 830 may comprise 3-axis accelerometers, 3-axis gyroscopes, and/or magnetometers. The IMU 830 may provide velocity, orientation, and/or other position related information to the processor 840. In some embodiments, the IMU 830 may output measured information in synchronization with the capture of each image frame by the sensor 810. In some embodiments, the output of the IMU 830 is used in part by the processor 840 to fuse the sensor measurements and/or to further process the fused measurements.

The system 800A may also include a screen or display and/or speaker as the output unit 870 rendering images, such as color and/or depth images. In some embodiments, the display and speaker 870 may be used to display live images captured by the sensor 810, fused images, augmented reality images, graphical user interfaces (GUIs), and other program outputs. In some embodiments, the display 870 may include and/or be housed with a touchscreen to permit users to input data via some combination of virtual keyboards, icons, menus, or other GUIs, user gestures and/or input devices such as styli and other writing implements. In some embodiments, the display 870 may be implemented using a liquid crystal display or a light emitting diode (LED) display, such as an organic LED display. In other embodiments, the display 870 may be a wearable display.

Exemplary system 800A may also be modified in various ways in a manner consistent with the disclosure, such as, by adding, combining, or omitting one or more of the functional blocks shown. For example, in some configurations, the system 800A may not include the IMU 830 or the sensors 810. In some embodiments, portions of the system 800A may take the form of one or more chipsets, and/or the like.

The processor (or one or more processors) 840 may be implemented using a combination of hardware, firmware, and software. The processor 840 may represent one or more circuits configurable to perform at least a portion of a computing procedure or process related to sensor fusion and/or methods for further processing the fused measurements. The processor 840 retrieves instructions and/or data from memory 850. The processor 840 may be implemented using one or more application specific integrated circuits (ASICs), central processing units (CPUs), graphical processing units (GPUs), digital signal processors (DSPs), DSP devices, programmable logic devices (PLDs), field programmable gate arrays (FPGAs), controllers, micro-controllers, microprocessors, embedded processor cores, quantum computing processors, electronic devices, other electronic units designed to perform the functions described herein, or a combination thereof.

The memory 850 may be implemented within the processor 840 and/or external to the processor 840. As used herein the term "memory" refers to any type of long term, short term, volatile, nonvolatile, or other memory and is not to be limited to any particular type of memory or number of memories, or type of physical media upon which memory is stored. In some embodiments, the memory 850 holds program codes that facilitate the decoding, shaping, deshaping, and encoding.

In some embodiments, additionally or alternatively, the processor 840 may perform one or combination of the encoding, decoding, and shaping/deshaping applications 845. For example, the output of the decoding may be used for decoding concatenated ECCs, which are formed from multiple component ECCs that are combined into a higher performance code. Another example is a system employing iterative equalization and decoding, where soft-decision output from decoder is fed back to demodulator to refine the decoder input iteratively. Yet another example is acting on the decoded output, e.g., showing the output on the display and speaker 870, storing the output in the memory 850, transmitting the output using the transceiver 860, and/or performing the actions based on the output and measurements of the sensor 810.

Figure 8B:
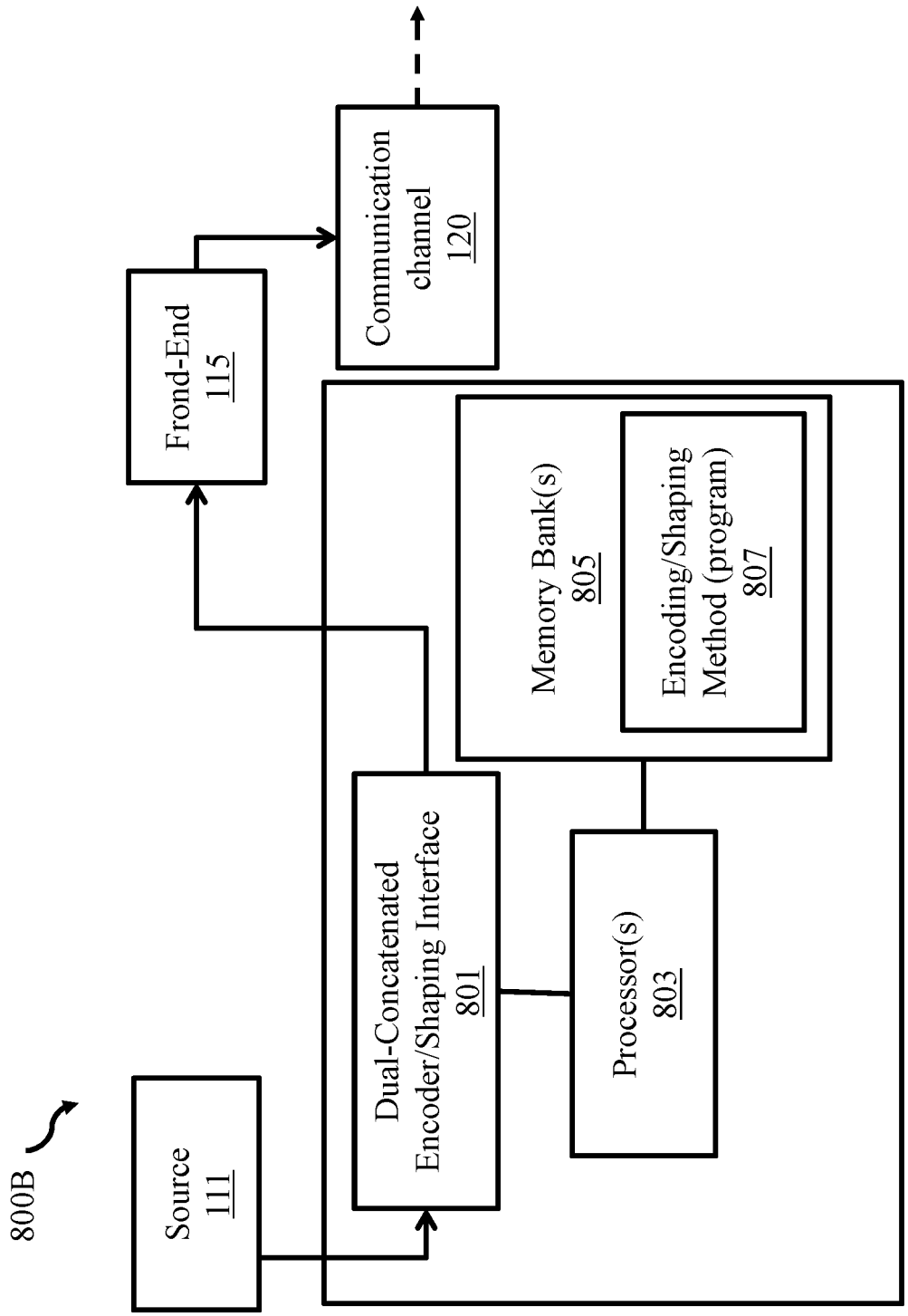
FIG. 8B is a schematic illustrating a block diagram of a dual-concatenated encoder and shaping circuit for generating an encoded/shaped digital data from an input digital data, according to some embodiments.

Further, another embodiment of the present invention may provide an encoder circuit for generating an encoded digital data from an input digital data. FIG. 8B is a schematic illustrating a block diagram of a dual-concatenated encoder/shaping circuit (or simply encoder) 800B for generating an encoded/shaped digital data from an input digital data. The encoder/shaping circuit 800B is configured to generate an encoded/shaped digital data from a source bit stream as an input digital data. The encoder/shaping circuit may include a dual-concatenated encoder and shaping interface 801 configured to receive the source bit stream 111, at least one memory bank 805 configured to store a computer-executable encoding method 807 (program/computer-executable instructions/or equivalent circuit), and one or more computing processors 803 configured to generate a codeword as an encoded digital data from the input digital data by performing steps of the computer-executable encoding method. In this case, the computer-executable encoding method 807 is configured to cause the processor 803 to perform steps based on a code specification. In some embodiments, the generated digital data is modulated to be fed into the communication channel 120 via the front-end circuit 115.

Figure 8C:
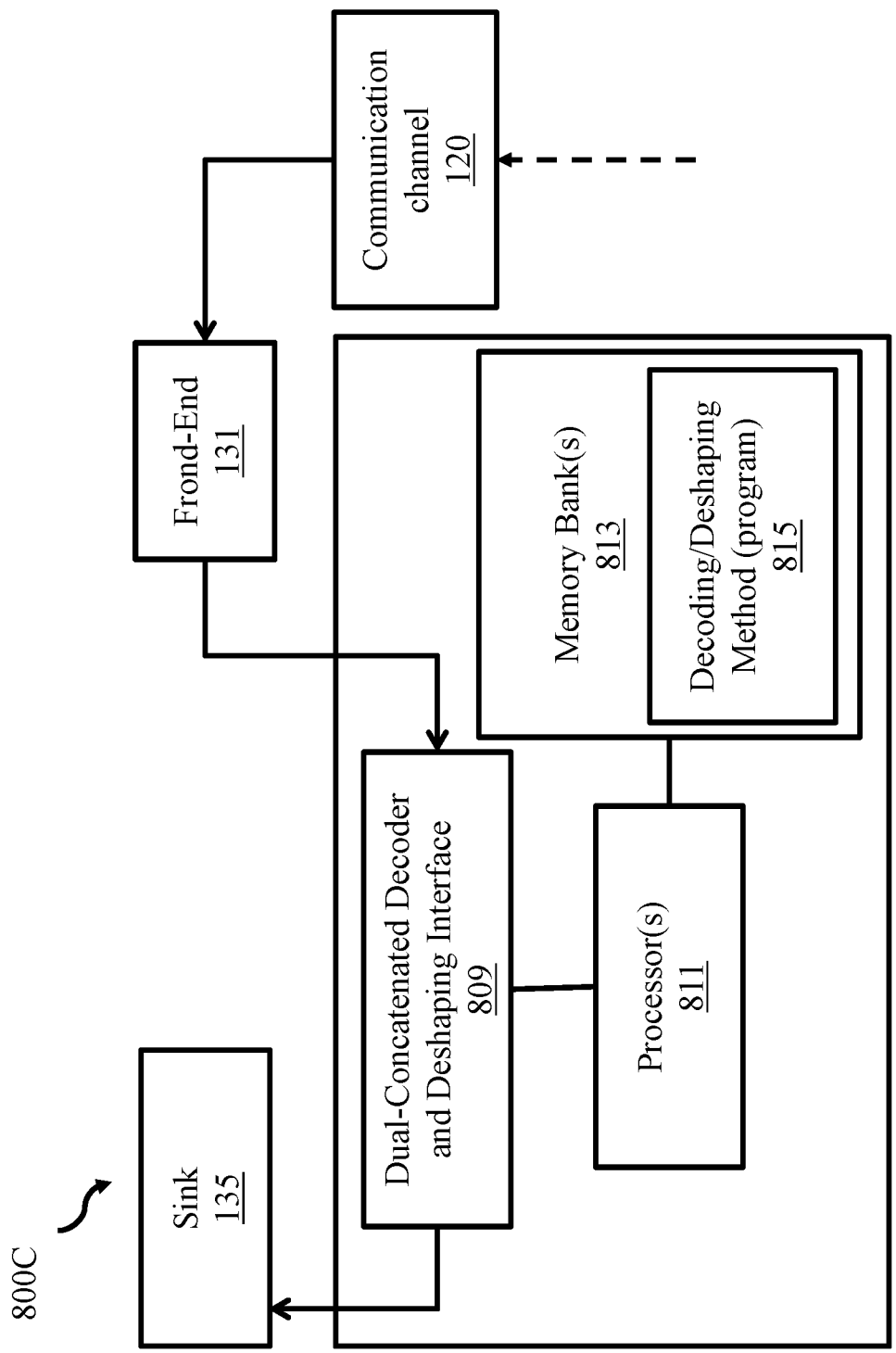
FIG. 8C is a schematic illustrating a block diagram of a dual-concatenated decoder and deshaping circuit for decoding/deshaping an encoded/shaped digital data, according to some embodiments.

FIG. 8C is a schematic illustrating a block diagram of a dual-concatenated decoder and deshaping circuit (or simply, decoder) 800C for decoding an encoded digital data and deshaping the shaped symbols, according to some embodiments of the present invention. The decoder circuit 800C is configured to generate decoded digital data from an encoded digital data represented by an encoded (noisy) codeword received from the communication channel 120. The decoder/deshaping circuit 800C includes a dual-concatenated decoder and deshaping interface 809 configured to receive the encoded and shaped codeword as an input data from a noisy version of a modulated encoded digital data, at least one memory bank 813 configured to store a computer-executable decoding method (program/computer-executable instructions/or equivalent circuit) 815 and one or more computing processors 811. In this case, the computer-executable decoding method (program) 815 causes the one or more computing processors 811 to generate the decoded/deshaped digital data from the encoded/shaped codeword from the decoder/deshaping interface 809 by performing steps of the computer-executable decoding method. According to the computer-executable decoding method, the one or more computing processors 811 perform the steps based on a code specification. The code specification comprises at least two overheads and two codeword lengths for the pre-shaping FEC and post-shaping FEC codes, and a shaping rate with shaping prefix trees. Further, the one or more processors 811 generate an output message as a decoded/deshaped digital data in a specified order according to a block interleaver via the computer-executable decoding/deshaping method 815.

Power Consumption and Latency Reduction

In such a manner, the present invention provides a way to reduce the input BER threshold, which in turn may reduce the overall complexity. For example, some example embodiments use a concatenated coding of soft-decision LDPC codes and hard-decision BCH codes for the post-shaping FEC layer, whereas additional hard-decision BCH codes are used for the pre-shaping FEC layer. Using the proposed dual-concatenated BCH codes in pre-shaping and post-shaping FEC codes, the BER threshold for the LDPC coding may be significantly decreased. This provides incentive to use a lower-performance LDPC coding, hence reduction in the power consumption. For example, the reduction of BER threshold from $10^{-5}$ to $10^{-4}$ may correspond the reduction of required BP decoding iterations from 32 to 16. For this case, it may save half of the power consumption for decoding operation. Even though additional BCH codes are required, the power reduction for the SD FEC codes is more important because HD FEC decoding is considerably simpler than SD FEC decoding.

In addition, the improved BER threshold may open new avenues to use a lower-latency LDPC coding. For example, the reduction of BER threshold from $10^{-5}$ to $10^{-4}$ may correspond the reduction of required LDPC codeword length from 26,400 bits to 13,200 bits. In some example embodiments, it may decrease the maximum encoding/decoding latency by half.

Thus, example embodiments disclosed herein provide significant improvements over existing solutions in the field of endeavor and are clearly inventive. Further, since the proposed solutions have direct applications in communication technology, embodiments and variants thereof bring about tangible outcomes that are non-obvious as well as useful.

All the above-described embodiments of the present invention may be implemented in any of numerous ways. For example, the embodiments may be implemented using hardware, firmware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

What is claimed is:

1. A computer-implemented method for encoding digital data, comprising:
   accessing a source bit stream as an input digital data, wherein the source bit stream comprises a plurality of sequences of bits;
   encoding the input digital data by appending pre-shaping parity bits to each sequence of the plurality of sequences of bits, according to a pre-shaping error-correction code to obtain a plurality of de-shaped sequences of bits as encoded data;
   mapping the encoded data into a series of amplitude modulation symbols, wherein the mapping comprises modifying a distribution of bits of each de-shaped sequence of the plurality of de-shaped sequences of bits according to a shaping mapper to obtain shaped amplitude modulation symbols;
   labeling the shaped amplitude modulation symbols into a shaped bit stream; and
   encoding the shaped bit stream by appending post-shaping parity bits according to a post-shaping error-correction code.

2. The method according to claim 1, wherein the shaping mapper is a Huffman-coded sphere shaping, a shell mapping, a multi-set partition distribution matching, a constant-composite distribution matching, a hierarchical distribution matching, an enumerative sphere shaping, a look-up table or a combination thereof, for determining the series of amplitude symbols given the pre-shaping parity bits for matching a probability mass function for a set of amplitude symbols to a target distribution.

3. The method according to claim 1, wherein the post-shaping error-correction code is a soft-decision coding based on low-density parity-check codes, turbo convolutional codes, turbo block codes, polar codes, staircase codes, or a variant thereof.

4. The method according to claim 1, wherein the post-shaping error-correction code is a serial concatenation of hard-decision coding and soft-decision coding, wherein the hard-decision coding is based on Reed-Solomon codes, Bose-Chaudhuri-Hocquenghem (BCH) codes, Reed-Muller codes, quasi-cyclic codes, Hamming codes, or a variant thereof, and wherein the soft-decision coding is based on low-density parity-check codes, turbo convolutional codes, turbo block codes, polar codes, staircase codes, or a variant thereof.

5. The method according to claim 1, wherein the pre-shaping error-correction code is a burst error-correcting code based on fire codes, Reed-Solomon codes, BCH codes, Hamming codes, or a variant thereof, wherein a plural of codewords are arranged in a specified order by a block interleaving.

6. The method according to claim 1, wherein the pre-shaping error-correction code and the post-shaping error-correction code use a balanced overhead such that a total data rate is maximized depending on a shaping rate and shaping length specified by the shaping mapper.

7. The method according to claim 1, wherein mapping the encoded data to the series of amplitude modulation symbols further comprises mapping the pre-shaping bits of each sequence of the plurality of sequences of bits into one or more symbols of the series of amplitude modulation symbols by appending redundancy to match a probability mass function (PMF) of amplitude occurrence to a target distribution.

8. The method according to claim 1, further comprising mapping the encoded shaped bit stream into a series of quadrature amplitude modulation symbols for feeding to a channel for transmission.

9. A computer-implemented method for decoding an encoded bit stream, performed by one or more computing processors, comprising:
   accessing an input data which represents a noisy codeword;
   demapping the input data to generate soft-decision bit stream;
   decoding the soft-decision bit stream according to a post-shaping error-correction code to obtain a decoded bit stream comprising a plurality of decoded bit labels;
   mapping the decoded bit labels into a series of amplitude modulation symbols;
   demapping the series of amplitude modulation symbols to a plurality of de-shaped sequences of bits according to a shaping demapper, wherein the demapping comprises modifying a distribution of bits in each symbol of the series of amplitude modulation symbols to obtain a de-shaped bit stream; and
   decoding the de-shaped bit stream according to a pre-shaping error-correction code, wherein the decoding the de-shaped bit stream comprises removing parity bits from each sequence of bits of the de-shaped bit stream to generate decoded data corresponding to the input data.

10. The method according to claim 9, wherein the shaping demapper is based on a Huffman-coded sphere shaping, a shell mapping, a multi-set partition distribution matching, a constant-composite distribution matching, a hierarchical distribution matching, an enumerative sphere shaping, a look-up table and a combination thereof, to convert the series of amplitude modulation symbols into the plurality of de-shaped sequences of bits for reversing a probability mass function of amplitude symbols to a uniform distribution.

11. The method according to claim 9, wherein the post-shaping error-correction code is a soft-decision coding based on low-density parity-check codes, turbo convolutional codes, turbo block codes, polar codes, staircase codes, or a variant thereof, wherein the soft-decision coding uses message-passing decoding based on a sum-product algorithm, a min-sum algorithm, a delta-min algorithm, a bidirectional maximum a posteriori estimation, a list decoding or a variant thereof.

12. The method according to claim 9, wherein the post-shaping error-correction code is a serial concatenation of hard-decision coding and soft-decision coding, wherein the hard-decision coding is based on Reed-Solomon codes, Bose-Chaudhuri-Hocquenghem (BCH) codes, Reed-Muller codes, quasi-cyclic codes, Hamming codes, or a variant thereof, and wherein the soft-decision coding is based on low-density parity-check codes, turbo convolutional codes, turbo block codes, polar codes, staircase codes, or a variant thereof.

13. The method according to claim 9, wherein the pre-shaping error-correction code is a burst error-correcting code based on fire codes, Reed-Solomon codes, BCH codes, Hamming codes, or a variant thereof, wherein a plural of codewords are arranged in a specified order by a block interleaving.

14. An encoder, comprising:
a memory configured to store executable instructions; and
one or more processors configured to execute the instructions to:
  access a source bit stream as an input digital data, wherein the source bit stream comprises a plurality of sequences of bits;
  encode the input digital data by appending pre-shaping parity bits to each sequence of the plurality of sequences of bits, according to a pre-shaping error-correction code to obtain a plurality of de-shaped sequences of bits as encoded data;
  map the encoded data into a series of amplitude modulation symbols, wherein the mapping comprises modifying a distribution of bits of each de-shaped sequence of the plurality of de-shaped sequences of bits according to a shaping mapper to obtain shaped amplitude modulation symbols;
  label the shaped amplitude modulation symbols into a shaped bit stream; and
  encode the shaped bit stream by appending post-shaping parity bits according to a post-shaping error-correction code.

15. The encoder of claim 14, wherein to map the encoded data to the series of amplitude modulation symbols, the one or more processors are further configured to map the pre-shaping bits of each sequence of the plurality of sequences of bits into one or more symbols of the series of amplitude modulation symbols by appending redundancy to match a probability mass function (PMF) of amplitude occurrence to a target distribution.

16. The encoder of claim 14, wherein the one or more processors are further configured to map the encoded shaped bit stream into a series of quadrature amplitude modulation symbols for feeding to a channel for transmission.

17. A decoder, comprising:
a memory configured to store executable instructions; and
one or more processors configured to execute the instructions to:
  access an input data which represents a noisy codeword;
  demap the input data to generate soft-decision bit stream;
  decode the soft-decision bit stream according to a post-shaping error-correction code to obtain a decoded bit stream comprising a plurality of decoded bit labels;
  map the decoded bit labels into a series of amplitude modulation symbols;
  demap the series of amplitude modulation symbols to a plurality of de-shaped sequences of bits according to a shaping demapper, wherein the demapping comprises modifying a distribution of bits in each symbol of the series of amplitude modulation symbols to obtain a de-shaped bit stream; and
  decode the de-shaped bit stream according to a pre-shaping error-correction code, wherein the decoding the de-shaped bit stream comprises removing parity bits from each sequence of bits of the de-shaped bit stream to generate decoded data corresponding to the input data.

18. A system for transferring a digital data over a communication channel, comprising:
a transmitter comprising:
  a source configured to accept a source data to be transferred;
  an encoder configured to encode the source data, wherein the encoder comprises:
    a memory configured to store executable instructions; and
    one or more processors configured to execute the instructions to:
      access the source data as an input digital data, wherein the source data comprises a plurality of sequences of bits;
      encode the input digital data by appending pre-shaping parity bits to each sequence of the plurality of sequences of bits, according to a pre-shaping error-correction code to obtain a plurality of de-shaped sequences of bits as encoded data;
      map the encoded data into a series of amplitude modulation symbols, wherein the mapping comprises modifying a distribution of bits of each de-shaped sequence of the plurality of de-shaped sequences of bits according to a shaping mapper to obtain shaped amplitude modulation symbols;
      label the shaped amplitude modulation symbols into a shaped bit stream; and
      encode the shaped bit stream by appending post-shaping parity bits according to a post-shaping error-correction code; and
  a front-end interface configured to transmit the encoded shaped bit stream as a modulated signal into the communication channel;
a receiver comprising:
  a front-end interface configured to receive an output signal from the communication channel;
  a decoder configured to decode the output signal, wherein the decoder comprises:
    a memory configured to store executable instructions; and
    one or more processors configured to execute the instructions to:

access an input data which represents a noisy codeword;

demap the input data to generate soft-decision bit stream;

decode the soft-decision bit stream according to a post-shaping error-correction code to obtain a decoded bit stream comprising a plurality of decoded bit labels;

map the decoded bit labels into a series of amplitude modulation symbols;

demap the series of amplitude modulation symbols to a plurality of de-shaped sequences of bits according to a shaping demapper, wherein the demapping comprises modifying a distribution of bits in each symbol of the series of amplitude modulation symbols to obtain a de-shaped bit stream; and decode the de-shaped bit stream according to a pre-shaping error-correction code, wherein the decoding the de-shaped bit stream comprises removing parity bits from each sequence of bits of the de-shaped bit stream to generate decoded data corresponding to the input data; and a controller configured to specify parameters of pre-shaping codes, post-shaping codes, shaping mappers, and shaping demappers used in the encoder and the decoder, depending on a knowledge of the channel, wherein the parameters further comprise codeword lengths, code rates, and overheads.

19. The system according to claim 18, wherein the decoder further comprises a set of pipelined decoders, wherein each of the pipelined decoder further comprises a set of parallel decoders.

20. The system according to claim 18, wherein the encoder further comprises a set of pipelined encoders, wherein each of the pipelined encoder further comprises a set of parallel encoders.

* * * * *